US012768936B2

(12) United States Patent
Stefanatos et al.

(10) Patent No.: US 12,768,936 B2
(45) Date of Patent: Oct. 20, 2026

(54) WAVEFORM PARAMETER AND FRAME DELAY COORDINATION FOR MULTI-RADAR COEXISTENCE

(71) Applicant: QUALCOMM Incorporated, San Diego, CA (US)

(72) Inventors: Stelios Stefanatos, San Diego, CA (US); Kapil Gulati, Belle Mead, NJ (US); Gene Wesley Marsh, San Diego, CA (US); Junyi Li, Fairless Hills, PA (US); Shailesh Patil, San Diego, CA (US); Arthur Gubeskys, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 18/293,170

(22) PCT Filed: Sep. 9, 2022

(86) PCT No.: PCT/US2022/076244
§ 371 (c)(1),
(2) Date: Jan. 29, 2024

(87) PCT Pub. No.: WO2023/056169
PCT Pub. Date: Apr. 6, 2023

(65) Prior Publication Data
US 2024/0377502 A1 Nov. 14, 2024

(30) Foreign Application Priority Data
Sep. 28, 2021 (GR) .............................. 20210100642

(51) Int. Cl.

| | |
|---|---|
| ***G01S 7/00*** | (2006.01) |
| ***G01S 7/02*** | (2006.01) |
| ***G01S 13/931*** | (2020.01) |

(52) U.S. Cl.
CPC ............ *G01S 7/006* (2013.01); *G01S 7/0235* (2021.05); *G01S 13/931* (2013.01); *G01S 2013/9316* (2020.01)

(58) Field of Classification Search
CPC .... G01S 13/584; G01S 13/003; G01S 13/931; G01S 13/872; G01S 2013/9316; G01S 7/0235; G01S 7/023
(Continued)

(56) References Cited

U.S. PATENT DOCUMENTS 3,702,476 A * 11/1972 Nathanson .............. G01S 13/24 342/201
5,124,710 A * 6/1992 Debuisser ............ G01S 13/225 342/204

(Continued)

FOREIGN PATENT DOCUMENTS

| | | |
|---|---|---|
| CN | 113325374 A | 8/2021 |
| WO | 2019013948 A1 | 1/2019 |
| WO | 2021001504 A1 | 1/2021 |

OTHER PUBLICATIONS

International Search Report and Written Opinion—PCT/US2022/076244—ISA/EPO—Dec. 20, 2022.

*Primary Examiner* — Michael W Justice
(74) *Attorney, Agent, or Firm* — Dinsmore & Shohl LLP

(57) ABSTRACT

Certain aspects of the present disclosure provide techniques for coordinating waveform parameters and frame delays for multi-radar coexistence. An example method performed by an apparatus comprising a radar device includes transmitting, based on a transmission configuration, one or more first signals of a plurality of signals in an environment via the radar device in a first frame of a plurality of frames according to a first delay value occurring after a frame prior to the first frame and transmitting one or more second signals via the radar device in at least a second frame of the plurality of (Continued)

frames according to a second delay value occurring after the first frame based on the transmission configuration. In some cases, the transmission configuration comprises a common transmission configuration for use in the environment. Additionally, in some cases, the second delay value is different from the first delay value.

24 Claims, 12 Drawing Sheets

(58) Field of Classification Search
USPC .............................................. 342/137, 70, 59
See application file for complete search history.

(56) References Cited

U.S. PATENT DOCUMENTS 7,239,707 B2 * 7/2007 Cangiani .................. H04K 1/02 380/252
8,063,744 B2 * 11/2011 Wu ....................... G01S 13/785 342/125
10,168,418 B1 * 1/2019 Al-Stouhi ............. G01S 13/931
10,199,835 B2 * 2/2019 Leabman .............. G01S 13/282
10,416,299 B2 * 9/2019 Schoor ................ G01S 13/0209
10,557,931 B2 * 2/2020 Schoor .................. G01S 13/584
10,775,479 B2 * 9/2020 Jonas .................... G01S 13/931
10,779,189 B2 * 9/2020 Khoryaev ............. H04L 47/283
11,073,598 B2 * 7/2021 Gulati ................... G01S 13/931
11,073,599 B2 * 7/2021 Rimini .................... G06F 7/582
11,086,320 B2 * 8/2021 Wu ...................... G05D 1/0276
11,251,893 B2 * 2/2022 Abedini ................ H04L 5/0069
11,280,879 B2 * 3/2022 Hong .................... G01S 13/343
11,438,792 B2 * 9/2022 Zhou ................. H04W 28/0226
11,500,094 B2 * 11/2022 Oggier .................. G01S 7/4815
11,605,297 B2 * 3/2023 Kim ........................ H04W 4/44
11,656,322 B2 * 5/2023 Aydogdu .............. G01S 13/343 342/60
11,740,345 B2 * 8/2023 Narayana Moorthy ..................... G01S 13/222 342/112
12,066,520 B2 * 8/2024 Wu ......................... G01S 7/288
12,367,155 B2 * 7/2025 He ...................... G06F 11/0793
2003/0048901 A1 * 3/2003 Cangiani .............. H04B 1/7075 380/252
2011/0156878 A1 * 6/2011 Wu ........................... G01S 5/06 340/10.1
2017/0131392 A1 * 5/2017 Schoor .................... G01S 13/42
2017/0131393 A1 * 5/2017 Schoor .................... G01S 13/42
2017/0187198 A1 * 6/2017 Leabman .............. G01S 13/282
2017/0261591 A1 * 9/2017 Zhang ..................... G01S 13/76
2017/0273128 A1 * 9/2017 Abedini .................. H04W 4/50
2018/0011179 A1 * 1/2018 Zhang ................... G01S 5/0205
2018/0156907 A1 * 6/2018 Cegla .................... G01S 15/105
2018/0172807 A1 * 6/2018 Korkut .................. G01S 7/4865
2018/0242190 A1 * 8/2018 Khoryaev ............. H04L 47/283
2019/0056477 A1 * 2/2019 Jonas .................... G01S 13/931
2019/0339358 A1 * 11/2019 Rimini .................. G01S 7/0232
2019/0361440 A1 * 11/2019 Wu ...................... G05D 1/0276
2020/0025865 A1 * 1/2020 Gulati ..................... G01S 13/42
2020/0284874 A1 * 9/2020 Narayana Moorthy ..................... G01S 13/222
2020/0344643 A1 * 10/2020 Zhou ................. H04W 28/0226
2020/0367193 A1 * 11/2020 Cha ....................... G01S 5/0236
2020/0386890 A1 * 12/2020 Oggier .................... G01S 17/26
2021/0003662 A1 * 1/2021 Aydogdu .............. G01S 13/343
2021/0063566 A1 * 3/2021 Smith .................... G06V 20/58
2021/0389416 A1 * 12/2021 Hong .................... G01S 7/0235
2021/0407297 A1 * 12/2021 Kim ......................... G01S 7/003
2022/0308204 A1 * 9/2022 Zaidi ..................... G01S 13/426
2023/0006760 A1 * 1/2023 Li ........................ H04B 10/524
2023/0136649 A1 * 5/2023 He ...................... G06F 11/0793 711/206
2023/0184883 A1 * 6/2023 Li ........................... G01S 7/003 342/59
2024/0319332 A1 * 9/2024 Shalita .................. G01S 13/881

* cited by examiner

WAVEFORM PARAMETER AND FRAME DELAY COORDINATION FOR MULTI-RADAR COEXISTENCE

CROSS-REFERENCE TO RELATED APPLICATION(S)

This application is a national stage application under 35 U.S.C. 371 of PCT/US2022/076244, filed Sep. 9, 2022, which claims benefit of and priority to Greece application No. 20210100642 filed Sep. 28, 2021, which are assigned to the assignee hereof and incorporated by reference herein in their entireties.

INTRODUCTION

Aspects of the present disclosure relate to wireless communications, and more particularly, to techniques coordinating waveform parameters and frame delays for multi-radar coexistence.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

Certain aspects can be implemented in a method performed by an apparatus comprising a radar device. The method generally includes transmitting, based on a transmission configuration, one or more first signals of a plurality of signals in an environment via the radar device in a first frame of a plurality of frames according to a first delay value occurring after a frame prior to the first frame, wherein the transmission configuration comprises a common transmission configuration for use in the environment, and transmitting one or more second signals via the radar device in at least a second frame of the plurality of frames according to a second delay value occurring after the first frame based on the transmission configuration, wherein the second delay value is different from the first delay value.

Certain aspects can be implemented in an apparatus comprising a radar device. The apparatus may include a memory comprising executable instructions and one or more processors configured to execute the executable instructions and cause the apparatus to: transmit, based on a transmission configuration, one or more first signals of a plurality of signals in an environment via the radar device in a first frame of a plurality of frames according to a first delay value occurring after a frame prior to the first frame, wherein the transmission configuration comprises a common transmission configuration for use in the environment, and transmit one or more second signals via the radar device in at least a second frame of the plurality of frames according to a second delay value occurring after the first frame based on the transmission configuration, wherein the second delay value is different from the first delay value.

Certain aspects can be implemented in an apparatus comprising a radar device. The apparatus may include means for transmitting, based on a transmission configuration, one or more first signals of a plurality of signals in an environment via the radar device in a first frame of a plurality of frames according to a first delay value occurring after a frame prior to the first frame, wherein the transmission configuration comprises a common transmission configuration for use in the environment, and means for transmitting one or more second signals via the radar device in at least a second frame of the plurality of frames according to a second delay value occurring after the first frame based on the transmission configuration, wherein the second delay value is different from the first delay value.

Certain aspects can be implemented in a non-transitory computer-readable medium. The non-transitory computer-readable medium may include executable instructions that, when executed by one or more processors of an apparatus, cause the apparatus to: transmit, based on a transmission configuration, one or more first signals of a plurality of signals in an environment via a radar device of the apparatus in a first frame of a plurality of frames according to a first delay value occurring after a frame prior to the first frame, wherein the transmission configuration comprises a common transmission configuration for use in the environment, and transmit one or more second signals via the radar device in at least a second frame of the plurality of frames according to a second delay value occurring after the first frame based on the transmission configuration, wherein the second delay value is different from the first delay value.

Certain aspects can be implemented in a computer program product. The computer program product may be embodied on a computer-readable storage medium and may comprising code for: transmitting, based on a transmission configuration, one or more first signals of a plurality of signals in an environment via a radar device of an apparatus in a first frame of a plurality of frames according to a first delay value occurring after a frame prior to the first frame, wherein the transmission configuration comprises a common transmission configuration for use in the environment, and transmitting one or more second signals via the radar device in at least a second frame of the plurality of frames according to a second delay value occurring after the first frame based on the transmission configuration, wherein the second delay value is different from the first delay value.

Certain aspects can be implemented in a method performed by a network entity. The method generally includes obtaining one or more measurements associated with an environment that includes a plurality of apparatuses, determining, based on the one or more measurements, a transmission configuration for transmitting one or more signals of a plurality of signals via a radar device in a plurality of frames, wherein the transmission configuration comprises a common transmission configuration for use in the environment, and transmitting signaling indicating the transmission configuration to one or more apparatuses of the plurality of apparatuses.

Certain aspects can be implemented in an apparatus. The apparatus may include a memory comprising executable instructions and one or more processors configured to execute the executable instructions and cause the apparatus to: obtain one or more measurements associated with an environment that includes a plurality of apparatuses, determine, based on the one or more measurements, a transmission configuration for transmitting one or more signals of a plurality of signals via a radar device in a plurality of frames, wherein the transmission configuration comprises a common transmission configuration for use in the environment, and transmit signaling indicating the transmission configuration to one or more apparatuses of the plurality of apparatuses.

Certain aspects can be implemented in an apparatus. The apparatus may include means for obtaining one or more measurements associated with an environment that includes a plurality of apparatuses, means for determining, based on the one or more measurements, a transmission configuration for transmitting one or more signals of a plurality of signals via a radar device in a plurality of frames, wherein the transmission configuration comprises a common transmission configuration for use in the environment, and means for transmitting signaling indicating the transmission configuration to one or more apparatuses of the plurality of apparatuses.

Certain aspects can be implemented in a non-transitory computer-readable medium. The non-transitory computer-readable medium may include executable instructions that, when executed by one or more processors of an apparatus, cause the apparatus to: obtain one or more measurements associated with an environment that includes a plurality of apparatuses, determine, based on the one or more measurements, a transmission configuration for transmitting one or more signals of a plurality of signals via a radar device in a plurality of frames, wherein the transmission configuration comprises a common transmission configuration for use in the environment, and transmit signaling indicating the transmission configuration to one or more apparatuses of the plurality of apparatuses.

Certain aspects can be implemented in a computer program product. The computer program product may be embodied on a computer-readable storage medium and may comprising code for: obtaining one or more measurements associated with an environment that includes a plurality of apparatuses, determining, based on the one or more measurements, a transmission configuration for transmitting one or more signals of a plurality of signals via a radar device in a plurality of frames, wherein the transmission configuration comprises a common transmission configuration for use in the environment, and transmitting signaling indicating the transmission configuration to one or more apparatuses of the plurality of apparatuses.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Figure 1:
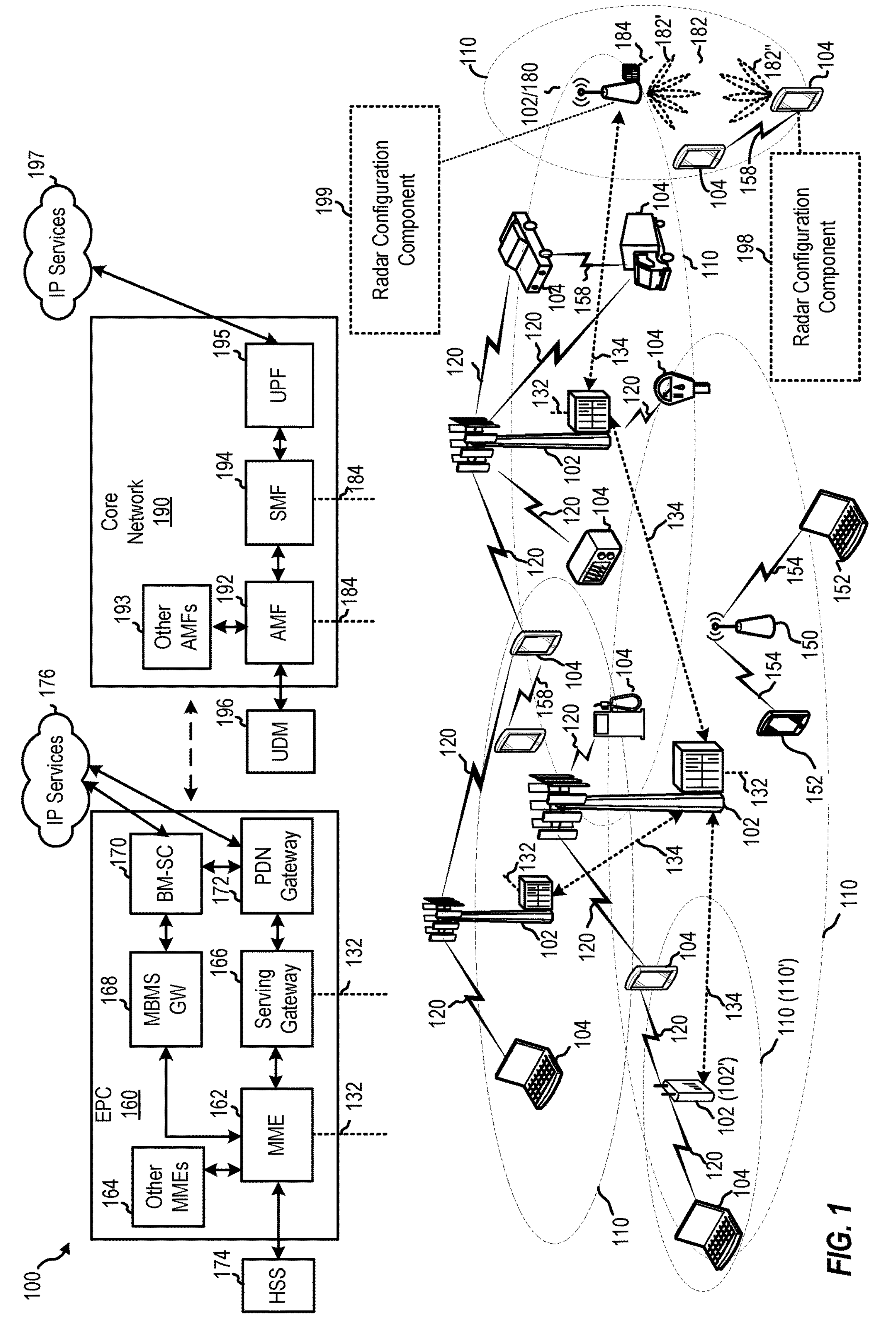
FIG. 1 is a block diagram conceptually illustrating an example wireless communication network.

Aspects of the present disclosure provide apparatuses, methods, processing systems, and computer-readable mediums for coordinating waveform parameters and frame delays for multi-radar coexistence.

In some cases, vehicles within an environment may use radar devices to sense targets in the environment, such as non-cellular V2X vehicles, vulnerable road users (VRUs), and road obstacles, thereby enhancing situational awareness when operating in the environment. Sensing these targets within the environment may help the vehicle to improve driving decisions and maneuvers. However, while radar devices generally improve situational awareness in the environment, operation of many radar devices in the environment, associated with different vehicles, may negatively impact the accuracy of sense objects within the environment. For example, multiple radars operating in the same environment may produce interfering signals, which may create “ghost” targets and/or result in an increase of a noise floor, which impacts detectability of (actual) targets within the environment. An increase in the noise floor or broadband noise within the environment is a main cause of misdetecting targets. Further, ghost targets may increase tracking complexity of radar devices and even have the potential to cause autonomous driving applications to malfunction, which can lead to catastrophic events.

Accordingly, aspects of the present disclosure provide techniques for reducing or eliminating interference in an environment in which multiple radar devices operate. In some cases, these techniques may involve coordinating waveform parameters and frame delays between radar devices associated with different vehicles. For example, in some cases, these techniques may include having radar devices of vehicles operating within a particular environment use a common transmission configuration when generating and transmitting signals such that all radar devices within the environment generate and transmit identical signals. Using a common transmission configuration whereby all radar devices within the environment generate and transmit identical may reduce broadband noise experienced in the environment (e.g., which is a major cause of misdetecting targets).

Further, the techniques presented herein may additionally assist radar devices of vehicles within the environment to more-easily discard or ignore these ghost targets. For example, such techniques may involve introducing varying or changing time delays between frames in which signals are transmitted by the radar devices. Changing or varying the time delays between frames in which the signals are transmitted by a radar device of a first vehicle may it appear (e.g., to a second vehicle) as if the first vehicle is a ghost target that is moving in an unrealistic manner (e.g., traveling hundreds of meters in a manner of millisecond or the like). When a radar device detects that a ghost target is moving in an unrealistic manner, the radar device may ignore or discard this ghost target. Accordingly, by implementing different varying delays between frames transmitted by vehicles within the environment, the radar devices of these vehicles may readily discard ghost targets from interfering vehicles.

Accordingly, the techniques presented herein reduce broadband noise within the environment, improving target detection reliability within the environment. Further, these techniques allow for detected ghost targets to be more-easily ignored/discarded by radar devices, reducing tracking complexity associated with the data-association and track-detection filter of radar devices and reducing the potential autonomous driving malfunctions. Additionally, by reducing tracking complexity, processing and power resources associated with the radar devices and corresponding vehicles may be conserved.

Introduction to Wireless Communication Networks

FIG. 1 depicts an example of a wireless communications network 100, in which aspects described herein may be implemented.

Generally, wireless communications network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

BSs 102 wirelessly communicate with UEs 104 via communications links 120. Each of the BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming.

In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". Base station 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same.

Similarly, the transmit and receive directions for UE 104 may or may not be the same.

Figure 7:
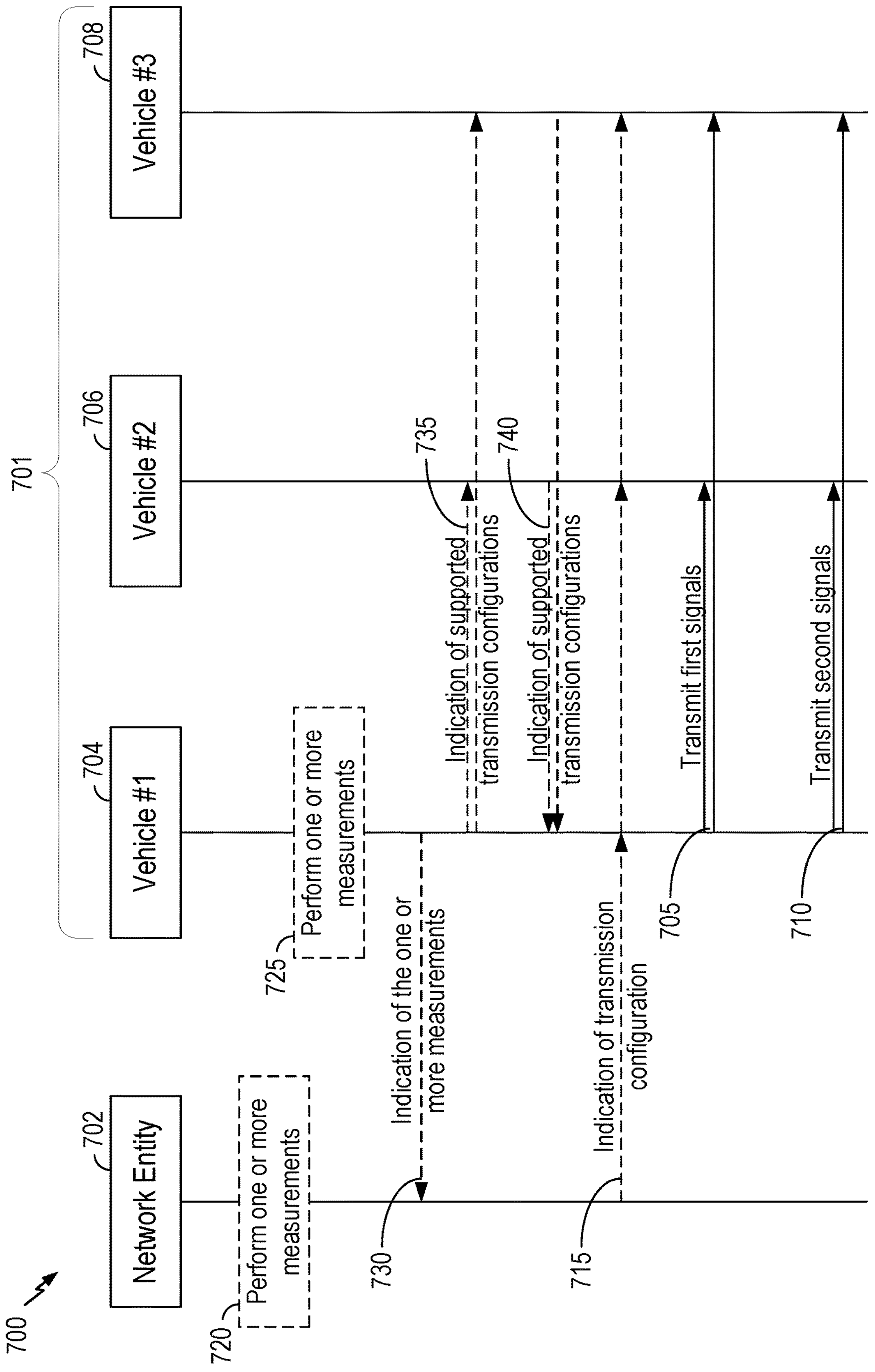
FIG. 7 is a call flow diagram illustrating example operations between a network entity and vehicles in an environment.
Figure 9:
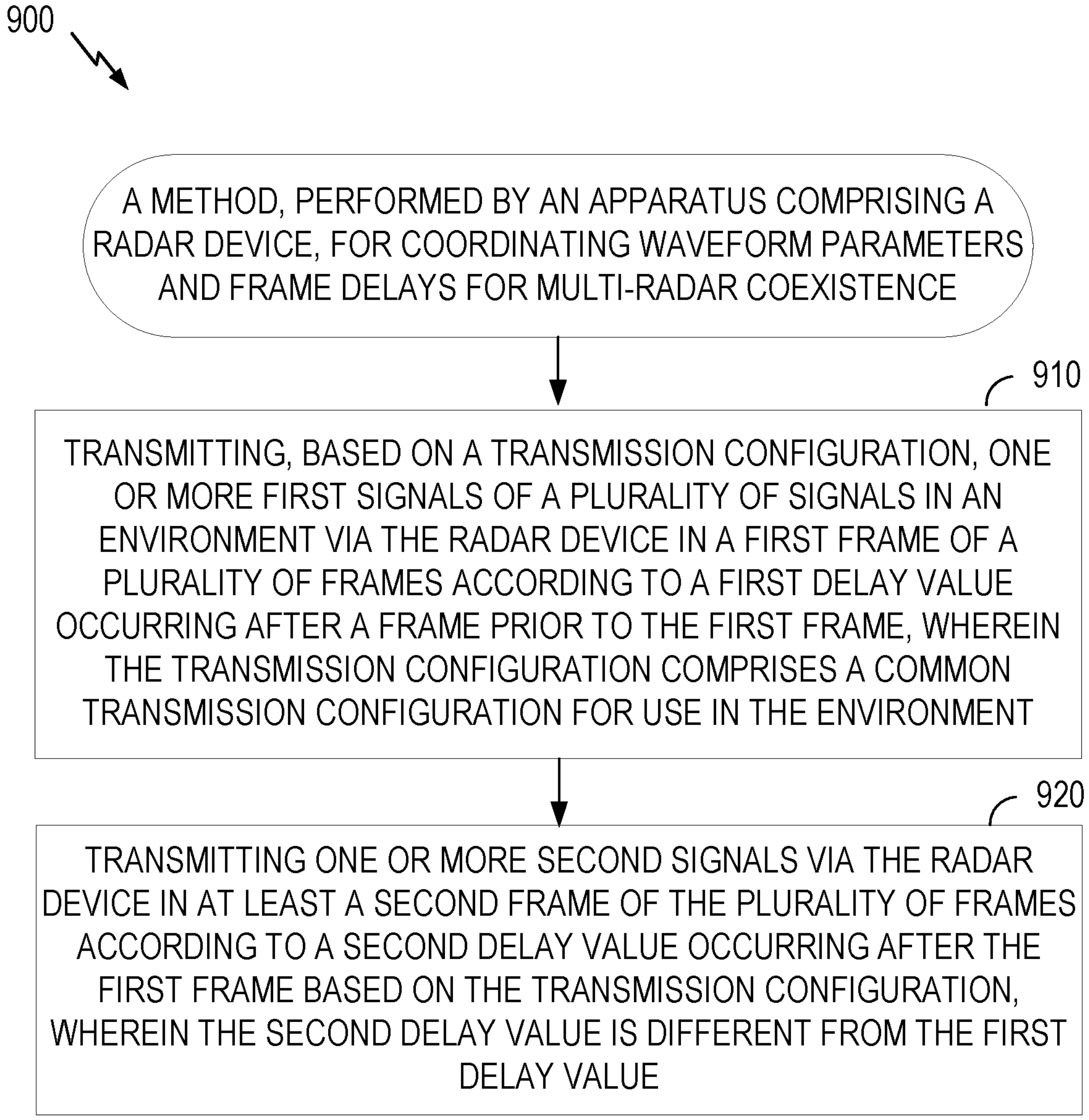
FIG. 9 is a flow diagram illustrating example operations for wireless communication by an apparatus comprising a radar device.
Figure 10:
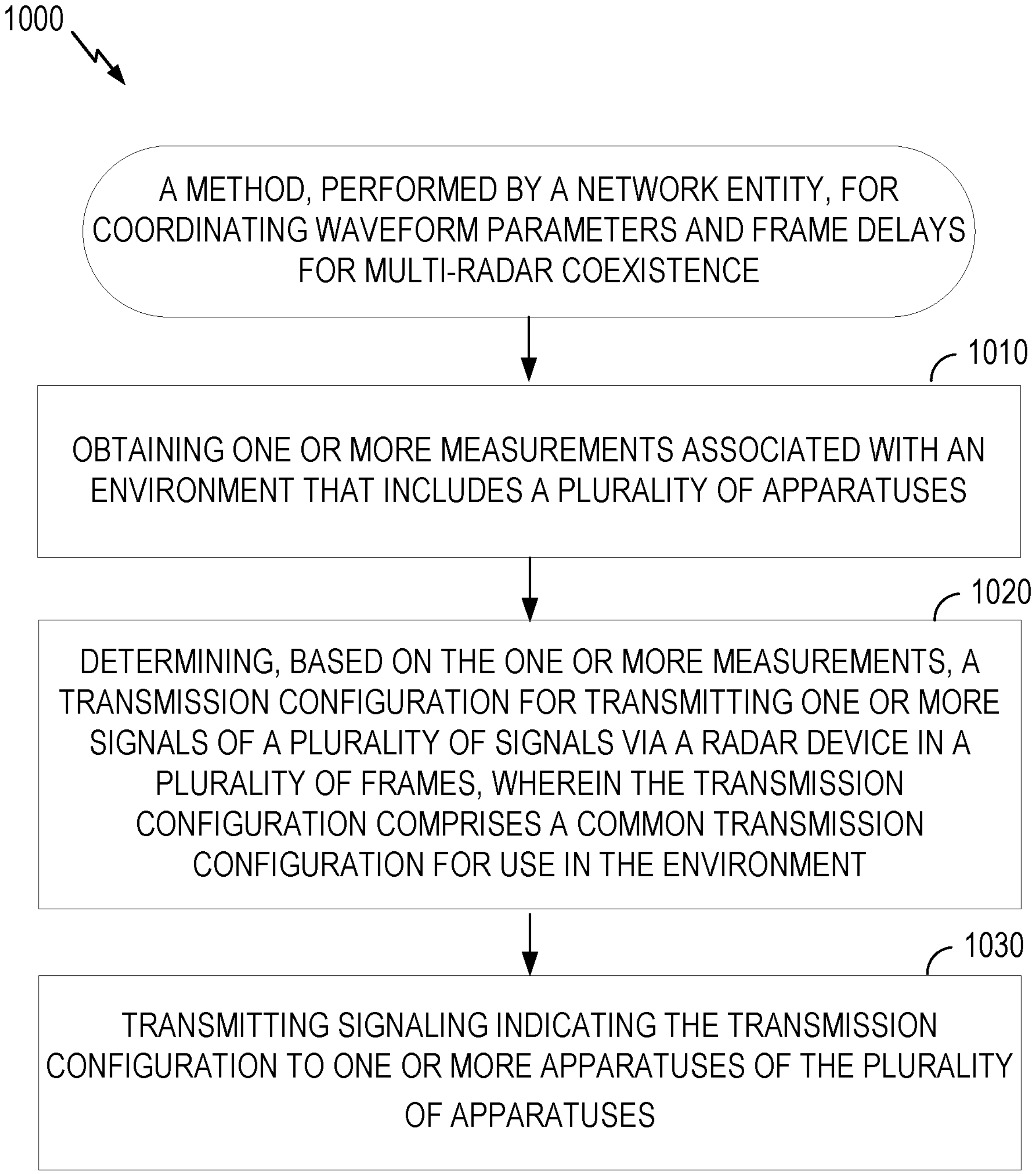
FIG. 10 is a flow diagram illustrating example operations for wireless communication by a network entity.

Wireless communication network 100 includes radar configuration component 199, which may be configured to perform the operations illustrated in one or more of FIG. 7 or 10, as well as other operations described herein for coordinating waveform parameters and frame delays for multi-radar coexistence. Wireless communications network 100 further includes radar configuration component 198, which may be configured to perform the operations illustrated in one or more of FIG. 7 or 9, as well as other operations described herein for coordinating waveform parameters and frame delays for multi-radar coexistence.

Figure 2:
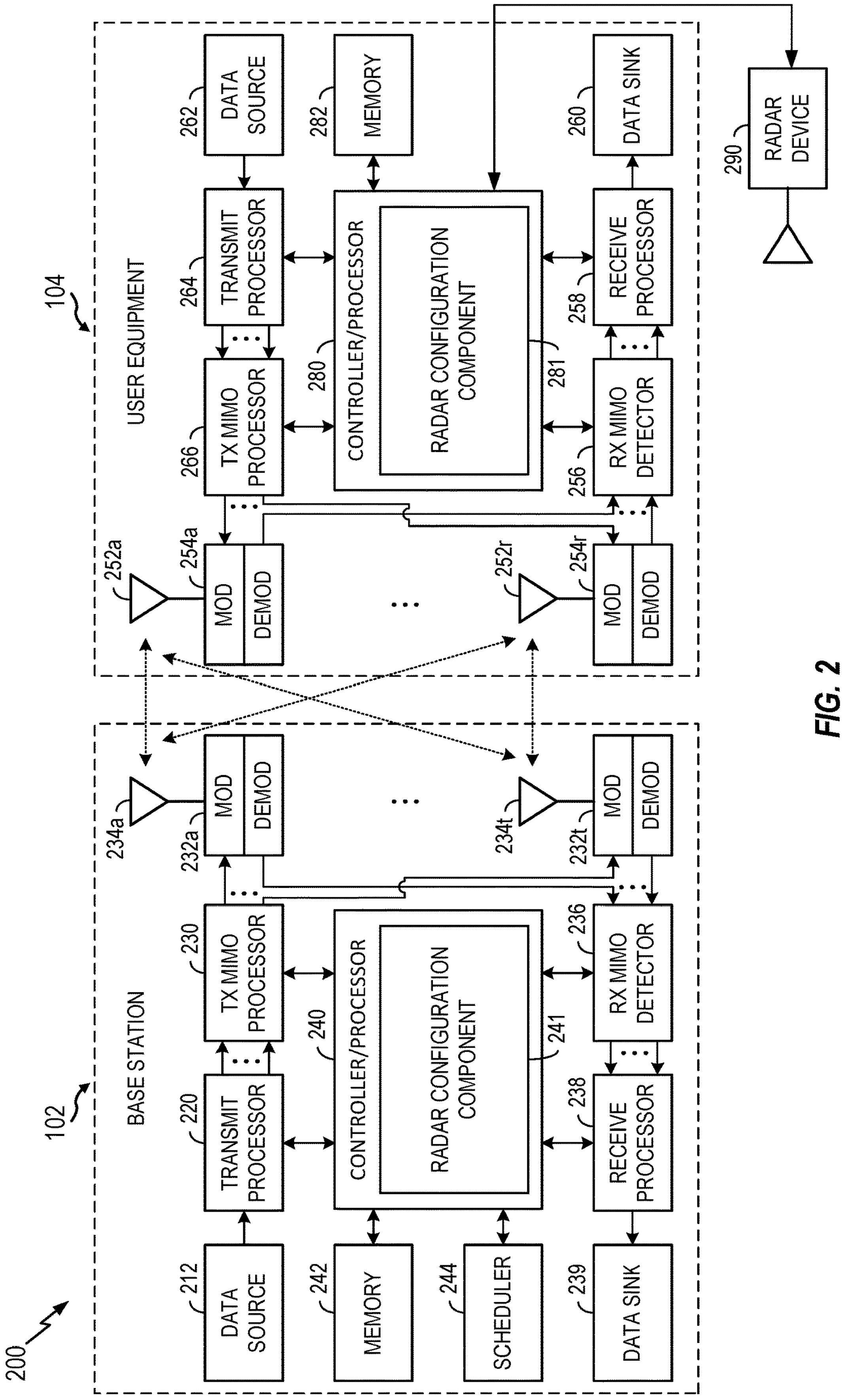
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes radar configuration component 241, which may be representative of radar configuration component 199 of FIG. 1. Notably, while depicted as an aspect of controller/processor 240, radar configuration component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes radar configuration component 281, which may be representative of radar configuration component 198 of FIG. 1. Notably, while depicted as an aspect of controller/processor 280, radar configuration component 281 may be implemented additionally or alternatively in various other aspects of UE 104 in other implementations. As shown, the controller/processor 280 is communicatively coupled with a radar device 290. The radar device 290 may be configured to transmit radar signals in one or more frames. In some cases, the controller/processor 280 may provide control signaling to the radar device 290 for controlling generation and transmission of these radar signals.

Figures 3A, 3B, 3C, 3D:
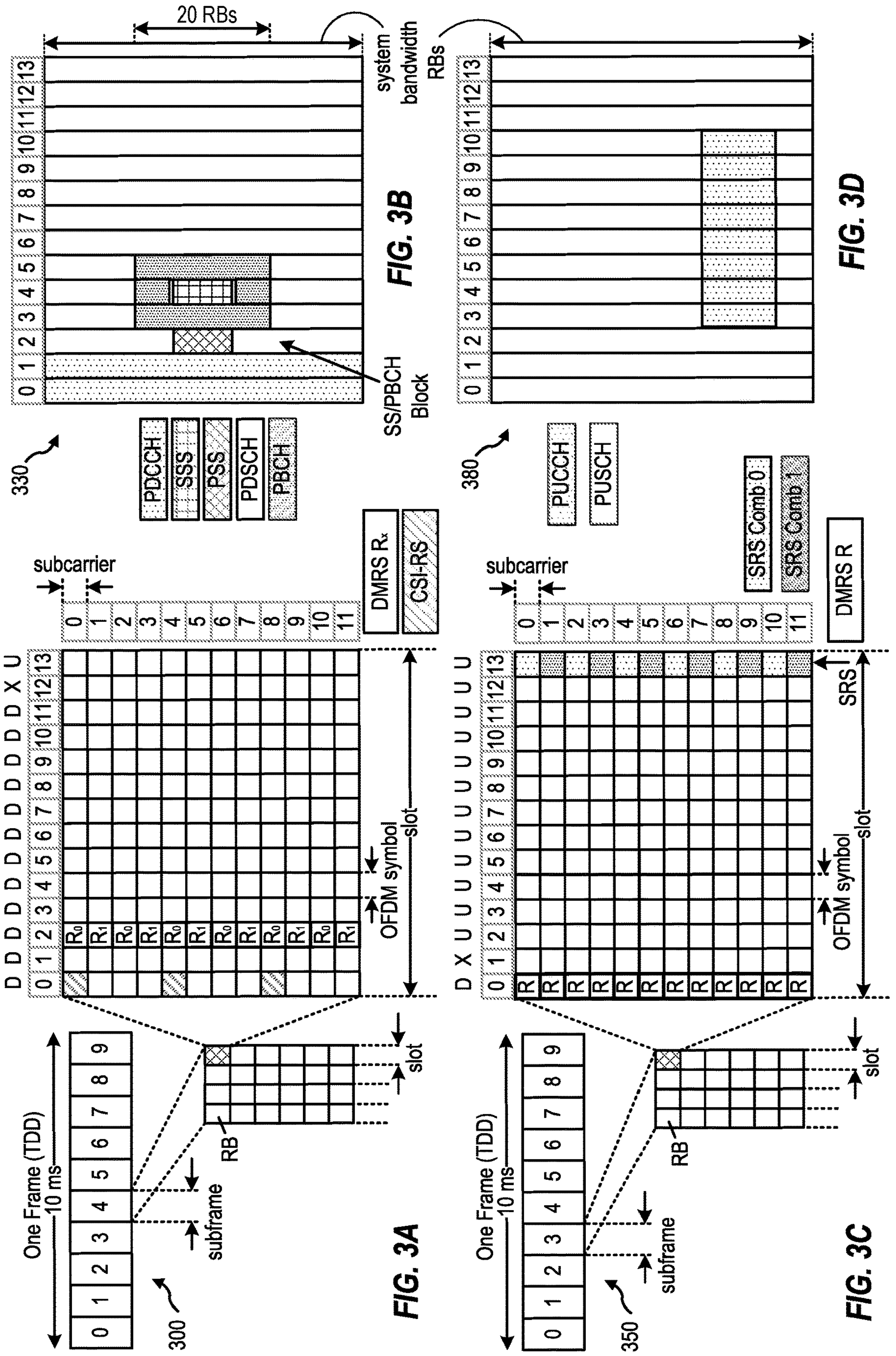
FIGS. 3A-3D depict various example aspects of data structures for a wireless communication network.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to Sidelink Communication

In some examples, two or more subordinate entities (e.g., UEs 104) may communicate with each other using sidelink signals. Real-world applications of such sidelink communications may include public safety, proximity services, UE-to-network relaying, vehicle-to-vehicle (V2V) communications, vehicle-to-everything (V2X), Internet of Everything (IoE) communications, IoT communications, mission-critical mesh, and/or various other suitable applications. Generally, a sidelink signal may refer to a signal communicated from one subordinate entity (e.g., UE 104) to another subordinate entity (e.g., another UE 104) without relaying that communication through the scheduling entity (e.g., UE 104 or BS 102), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations, resource reservations, and other parameters used for data transmissions, and the PSSCH may carry the data transmissions. The PSFCH may carry feedback such as acknowledgement (ACK) and or negative ACK (NACK) information corresponding to transmissions on the PSSCH. In some systems (e.g., NR Release 16), a two stage SCI may be supported. Two stage SCI may include a first stage SCI (SCI-1) and a second stage SCI (e.g., SCI-2). SCI-1 may include resource reservation and allocation information, information that can be used to decode SCI-2, etc. SCI-2 may include information that can be used to decode data and to determine whether the UE is an intended recipient of the transmission. SCI-1 and/or SCI-2 may be transmitted over PSCCH.

Figure 4B:
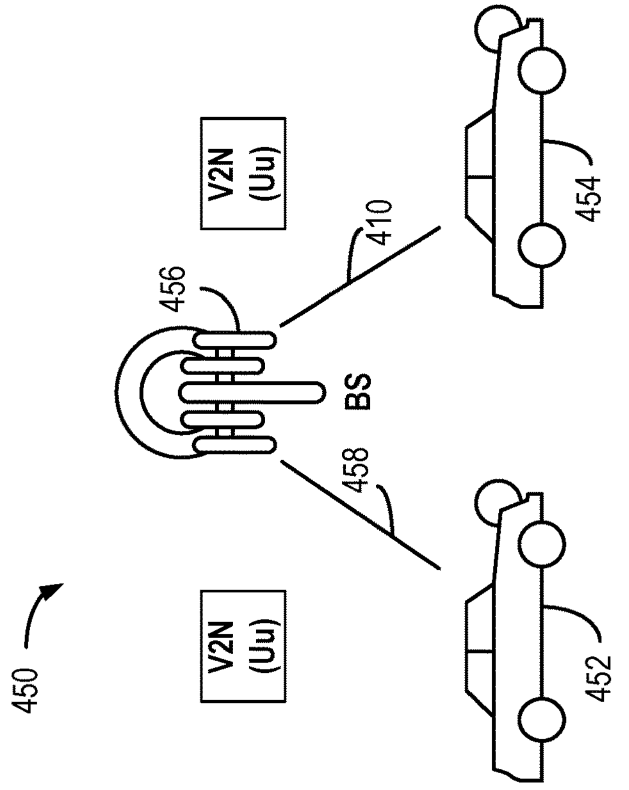
FIGS. 4A-4B show diagrammatic representations of example vehicle to everything (V2X) systems.
Figure 4A:
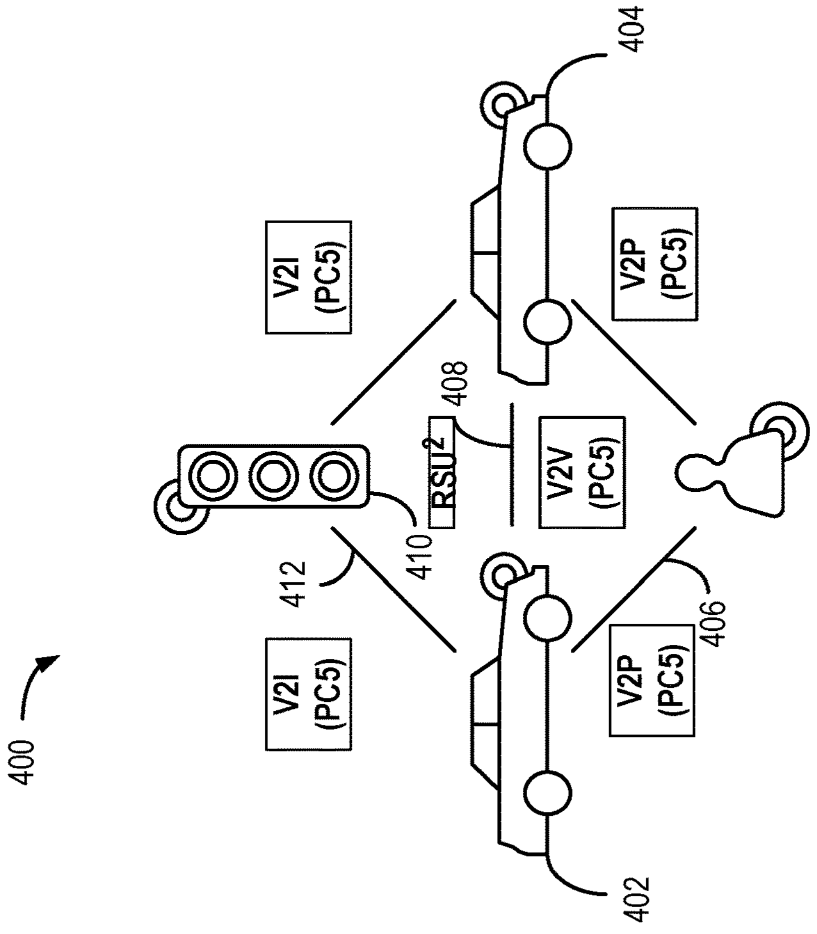

FIG. 4A and FIG. 4B show diagrammatic representations of example V2X systems, in accordance with some aspects of the present disclosure. For example, the vehicles shown in FIG. 4A and FIG. 4B may communicate via sidelink channels and may relay sidelink transmissions as described herein. V2X is a vehicular technology system that enables vehicles to communicate with the traffic and the environment around them using short-range wireless signals, known as sidelink signals.

The V2X systems provided in FIG. 4A and FIG. 4B provide two complementary transmission modes. A first transmission mode (also referred to as mode 4), shown by way of example in FIG. 4A, involves direct communications (for example, also referred to as sidelink communications) between participants in proximity to one another in a local area. A second transmission mode (also referred to as mode 3), shown by way of example in FIG. 4B, involves network communications through a network, which may be implemented over a Uu interface (for example, a wireless communication interface between a radio access network (RAN) and a UE).

Referring to FIG. 4A, a V2X system 400 (for example, including vehicle-to-vehicle (V2V) communications) is illustrated with two vehicles 402, 404. The first transmission mode allows for direct communication between different participants in a given geographic location. As illustrated, a vehicle can have a wireless communication link 406 with an individual (V2P) (for example, via a UE) through a PC5 interface. Communications between the vehicles 402 and 404 may also occur through a PC5 interface 408. In a like manner, communication may occur from a vehicle 402 to other highway components (for example, roadside unit (RSU) 410), such as a traffic signal or sign (V2I) through a PC5 interface 412. With respect to each communication link illustrated in FIG. 4A, two-way communication may take place between elements, therefore each element may be a transmitter and a receiver of information. The V2X system 400 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 4B shows a V2X system 450 for communication between a vehicle 452 and a vehicle 454 through a network entity 456. These network communications may occur through discrete nodes, such as a BS (e.g., the BS 102), that sends and receives information to and from (for example, relays information between) vehicles 452, 454. The network communications through vehicle to network (V2N) links 458 and 460 may be used, for example, for long-range communications between vehicles, such as for communicating the presence of a car accident a distance ahead along a road or highway. Other types of communications may be sent by the wireless node to vehicles, such as traffic flow conditions, road hazard warnings, environmental/weather reports, and service station availability, among other examples. Such data can be obtained from cloud-based sharing services.

RSUs, such as RSU 410, may be utilized. An RSU may be used for V2I communications. In some examples, an RSU may act as a forwarding node to extend coverage for a UE. In some examples, an RSU may be co-located with a BS or may be standalone. RSUs can have different classifications. For example, RSUs can be classified into UE-type RSUs and Micro NodeB-type RSUs. Micro NodeB-type RSUs have similar functionality as a Macro eNB or gNB. The Micro NodeB-type RSUs can utilize the Uu interface. UE-type RSUs can be used for meeting tight quality-of-service (QOS) requirements by minimizing collisions and improving reliability. UE-type RSUs may use centralized resource allocation mechanisms to allow for efficient resource utilization. Critical information (e.g., such as traffic conditions, weather conditions, congestion statistics, sensor data, etc.) can be broadcast to UEs in the coverage area. Relays can re-broadcasts critical information received from some UEs. UE-type RSUs may be a reliable synchronization source.

Aspects Related to Coordinating Waveform Parameters and Frame Delays for Multi-Radar Coexistence In some cases, vehicles, such as the V2X-capable vehicles 402, 404, 452, and 454 described above, may be equipped with one or more sensors, such as a radar device, that allow these vehicles to better perceive an environment (e.g., driving on a road) in which they operate. For example, a radar device, such as the radar device 290 illustrated in FIG. 2, may allow a particular vehicle to sense objects in the environment, such as non-cellular V2X vehicles, vulnerable road users (VRUs), and road obstacles, thereby enhancing situational awareness when operating in the environment. Sensing these objects within the environment may help the vehicle to improve driving decisions and maneuvers.

Figure 5A:
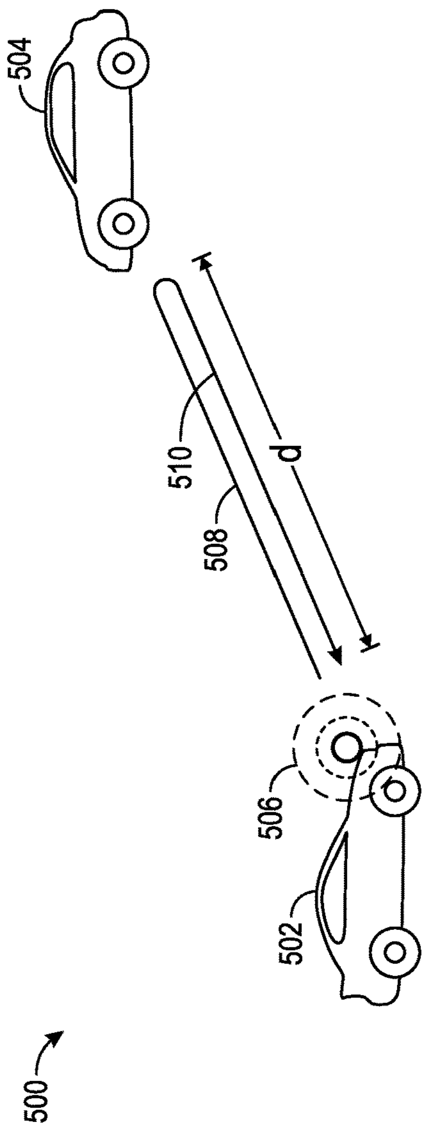
FIG. 5A illustrates using a radar device to detect objects in an environment.

FIG. 5A illustrates using a radar device to detect objects in an environment 500. As illustrated, the environment 500 includes a first vehicle 502 and a second vehicle 504. In some cases, the first vehicle 502 may be an example of any one of the vehicles 402, 404, 452, or 454 illustrated in FIG. 4. Additionally, in some cases, the first vehicle 502 may incorporate or be an example of the UE 104 illustrated in FIGS. 1 and 2.

In some cases, the first vehicle 502 may include a radar device (e.g., the radar device 290 illustrated in FIG. 2) that is configured to emit/transmit signals 506 to detect objects (e.g., also known as targets) in the environment 500. The signals 506 may include frequency-modulated continuous wave (FMCW) signals, known as "chirps", and may be generated based on a set of parameters. In some cases, these signals 506 may be transmitted in a gigahertz (GHz) frequency range (e.g., 24 GHZ, 35 GHz, 76.5 GHZ, 79 GHz, etc.) in one or more transmission frames. As shown in FIG. 5A, the signals 506 may include one or more signals 508, which are emitted by the radar device of the first vehicle 502. Thereafter, when an object or target, such as the second vehicle 504, is present in the environment 500, the one or more signals 508 may be reflected off of the second vehicle 504 and may be received by the radar device of the first vehicle 502 after a certain propagation delay ($\tau$).

This propagation delay may be represented as follows: $\tau=2d/c$, where d is the distance between the first vehicle 502 and the second vehicle 504 and c is the speed of light. Because the speed of light (c) is constant, the first vehicle 502 is able to determine the distance (d) of the second vehicle 504 relative to a position of the first vehicle 502 based on the propagation delay ($\tau$) between when the one or more signals 508 are emitted by the radar device of the first vehicle 502 and when one or more reflected signals 510 (e.g., reflections of the one or more signals 508) are received by the radar device of the first vehicle 502. In other words, the first vehicle 502 may determine the distance (d) of the second vehicle 504 by emitting the one or more signals 508 and measuring the time it takes for the one or more reflected signals 510 to be received by the radar device of the first vehicle 502.

Figure 5B:
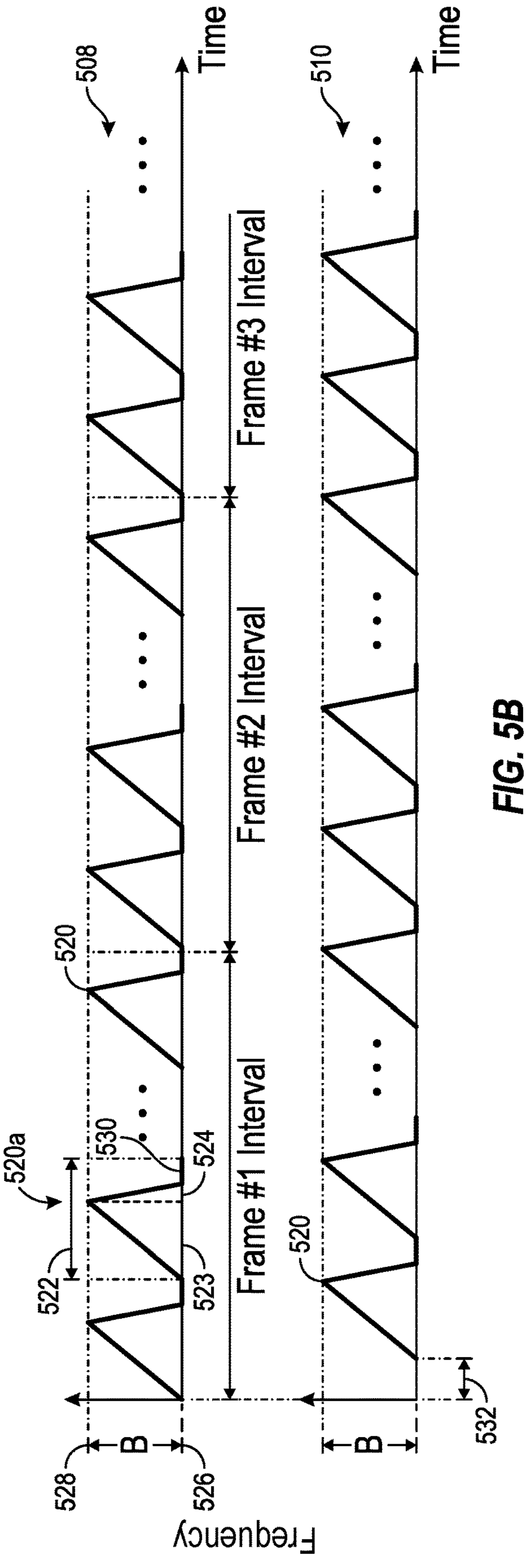
FIG. 5B shows a time and frequency plot illustrating the transmission of signals and reception of reflected signals via a radar device.

FIG. 5B shows a time and frequency plot illustrating the transmission of signals and reception of reflected signals, such as the one or more signals 508 and one or more reflected signals 510, by the radar device of the first vehicle 502. As shown, the radar device of the first vehicle 502 may be configured to transmit (e.g., emit) the one or more signals 508. The one or more signals 508 may be transmitted in a plurality of frames defined as a particular interval in time, such as frame interval #1, frame interval #2, and frame interval #3.

The one or more signals 508 within each frame interval may comprise a plurality of chirps 520 associated with a particular carrier frequency. A number of chirps within each frame interval may be the same. Each chirp may have a total duration 522 consisting of a frequency ramp up duration 523 and a frequency ramp down duration 524. The frequency ramp up duration 523 comprises a period of time in which a transmission frequency of a chirp 520*a* of the plurality of chirps 520 is increased from an initial transmission frequency 526 to a maximum transmission frequency 528. A difference between the initial transmission frequency 526 and the maximum transmission frequency 528 represents a bandwidth (B) or frequency sweep of the chirp 520*a*. Similarly, the frequency ramp down duration 524 comprises a period of time in which the transmission frequency of the chirp 520*a* is decreased from the maximum transmission frequency 528 to the initial transmission frequency 526. Following the chirp 520*a* there may be a duration 530 representing an inactive period occurring prior to the transmission of a subsequent chirp of the plurality of chirps 520.

As noted above, after the one or more signals 508 are transmitted by the first vehicle 502, the one or more signals 508 may be reflected off of the second vehicle 504 and received by the radar device of the first vehicle 502 as the one or more reflected signals 510. As shown in FIG. 5B, the one or more reflected signals 510 include the one or more chirps 520 of the one or more signals 508, which may be received by the radar device of the first vehicle after a propagation delay ($\tau$) 532 after being transmitted in the one or more signals 508.

Based on the propagation delay 532 associated with the one or more reflected signals 510, the radar device of the first vehicle 502 may determine the distance of the second vehicle 504 according to $c\tau/2$, where $\tau$ is the propagation delay and c is the speed of light. The radar device of the first vehicle 502 may also be able to determine a relative radial velocity and a direction (e.g., if equipped with multiple receive (RX) antennas) in a similar manner.

This procedure of transmitting/emitting the one or more signals 508 and receiving the one or more reflected signals 510 may be repeated by the radar device of the first vehicle 502 over multiple successive frames. Each frame will result in a number of "detections", one for each object or target in the environment 500, and indicate the target's distance/velocity/direction at the time the frame was transmitted. The radar device of the first vehicle 502 may then combine the detections in the successive frames, resulting in a time series of detections of targets that are input to a data-association and track-detection filter. In case of a single target, the task of the filter is to smooth out the detections of the target (e.g., from noise impairments) and create a "clean" trajectory (or track) of the target in the environment 500. In case of multiple targets, the task of the filter is to assign the detections of each frame to distinct targets and using previous target detections create the trajectories of all the targets present in the environment 500. The filter is also responsible for detecting and tracking new targets within the environment 500 as well as "dropping" targets that cannot be associated to any track or that are not associated with any new detections (e.g., targets that have left the environment 500).

However, while radar devices generally improve situational awareness in an environment, such as the environment 500, the operation of many radar devices in the environment, associated with different vehicles, may negatively impact the accuracy of sense objects within the environment. For example, multiple radars operating in the same environment and transmitting in overlapping time and frequency resources may produce interfering signals. These interfering signals may create "ghost" targets and/or result in an increase of a noise floor, which impacts detectability of (actual) targets within the environment.

Figure 6:
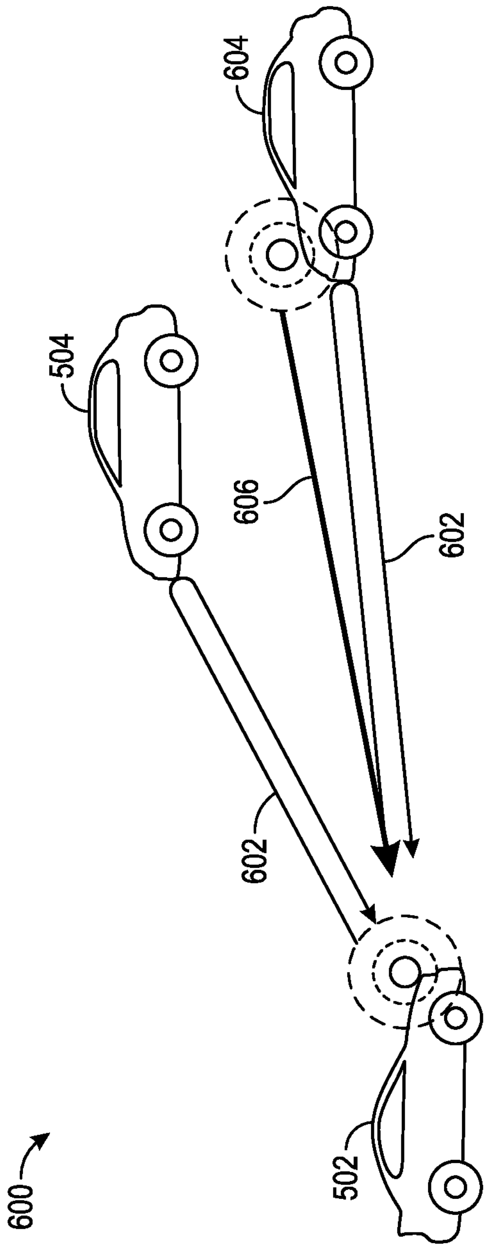
FIG. 6 illustrates an environment in which interfering signals are produced by multiple radar devices operating in the environment.

FIG. 6 illustrates an environment 600 in which interfering signals are produced by multiple radar devices operating in the environment 600. For example, as illustrated in FIG. 6, the environment 600 again includes the first vehicle 502 and the second vehicle 504. Similar to FIG. 5, the first vehicle 502 may transmit one or more signals 602 via a radar device (e.g., the radar device 290 illustrated in FIG. 2) in the environment 600 for detecting and tracking objects or targets within the environment 600.

Further, as illustrated, the environment 600 also includes a third vehicle 604, which may also include a radar device (e.g., the radar device 290 illustrated in FIG. 2) configured to transmit signals for detecting and tracing objects/targets within the environment 600. In some cases, when radars devices, such as the radar device of the first vehicle 502 and the radar device of the third vehicle 604, operate over the same frequency, signals from these radar device may interfere with each other. For example, as shown, in addition to the radar device of the first vehicle transmitting the one or more signals 602 and receiving corresponding reflections, the radar device of the first vehicle 502 may also receive a direct signal 606 from the radar device of the third vehicle 604.

In some cases, the direct signal 606 received from the radar device of the third vehicle 604 may increase a noise floor associated with the radar device of the first vehicle 502, rendering target detection by the radar device of the first vehicle 502 less reliable. Additionally, in some cases, the direct signal 606 received from the radar device of the third vehicle 604 may result in the radar device of the first vehicle 502 detecting "ghost" targets (e.g., targets that do not actually exist in the detected location, also known as "false alarms"). These ghost targets may increase tracking complexity associated with the data-association and track-detection filter of radar devices and even have the potential to cause autonomous driving applications to malfunction, which can lead to catastrophic events.

Accordingly, aspects of the present disclosure provide techniques for reducing or eliminating interference in an environment in which multiple radar devices operate. In some cases, these techniques may involve coordinating waveform parameters and frame delays between radar devices associated with different vehicles. For example, in some cases, these techniques may include having radar devices of vehicles operating within a particular environment (e.g., environment 600) use a common transmission configuration when generating and transmitting signals such that all radar devices within the environment generate and transmit identical signals.

By having the radar devices of all vehicles operating in the environment transmit identical signals, any interference caused between signals in the environment may result only in the creation of ghost targets at a victim radar device (e.g., a radar device receiving interfering signals). However, because the radar devices of all vehicles within the environment transmit an identical signal, a noise level increase within the environment (e.g., which is a main cause of misdetecting actual targets in the environment) is eliminated or at least significantly reduced as compared to when multiple radars operate in the environment without using identical signals.

Further, due to the fact that the primary interference experience in the environment is the creation of ghost targets once the common transmission configuration is applied by vehicles in the environment, the aspects of the present disclosure additionally involve techniques for assisting radar devices to more-easily discard or ignore these ghost targets. Such techniques may involve introducing varying or changing time delays between frames in which signals are transmitted by the radar devices. For example, changing or varying the time delays between frames in which the signals are transmitted by a radar device of a first vehicle may make it appear (e.g., to a second vehicle) as if the first vehicle is a ghost target that is moving in an unrealistic manner (e.g., traveling hundreds of meters in a manner of millisecond or the like), provided that the varying time delays are sufficiently different from those used by the second vehicle. Accordingly, the second vehicle may observe these unrealistic movements and discard or ignore ghost targets detected across frames due to signals transmitted by the radar device of the first vehicle. In other words, interference caused by the first vehicle's radar device may be readily removed by a radar device of second vehicle because the radar device of the first vehicle is making it appear as if the first vehicle is moving in an unrealistic manner, causing the radar device of the second vehicle to believe that the first vehicle is a ghost target that can be readily discarded or ignored.

Accordingly, the techniques presented herein reduce or eliminate broadband noise level increase within an environment in which multiple radar devices operate, improving target detection reliability within the environment. Further, these techniques allow for detected ghost targets to be naturally ignored/discarded by radar devices, reducing tracking complexity associated with the data-association and track-detection filter of radar devices and reducing the potential autonomous driving malfunctions. Additionally, by reducing tracking complexity, processing and power resources associated with the radar devices and corresponding vehicles may be conserved.

Example Call Flow Illustrating Operations for Coordinating Waveform Parameters and Frame Delays for Multi-Radar Coexistence FIG. 7 is a call flow diagram illustrating example operations 700 for coordinating waveform parameters and frame delays for multi-radar coexistence within an environment 701. As shown, the operations 700 may be performed by various apparatuses operating in the environment, such as the first vehicle 704, the second vehicle 706, and the third vehicle 708. In some cases, the first vehicle may 704 may include a first radar device and may be an example of the first vehicle 502 illustrated in FIGS. 5A and 6. Similarly, the second vehicle 706 may include a second radar device and may be an example of the second vehicle 504 illustrated in FIGS. 5A and 6. Further, the third vehicle 708 may include a third radar device and may be an example of the third vehicle 604 illustrated in FIG. 6. It should be understood that the operations 700 may also be applicable to situations in which vehicles include multiple radar devices. For example, in some cases, the second vehicle 706 and third vehicle 708 could be replaced with a one vehicle including multiple radar devices.

In some cases, each of the vehicles 704, 706, and 708 may be examples of, or incorporate, the UE 104 illustrated in FIGS. 1 and 2. In some cases, the radar devices of the vehicles 704, 706, and 708 may comprise the radar device 290 of the UE 104 illustrated in FIG. 2. Further, in some cases, each of the vehicles 704, 706, and 708 may be capable of communicating with each other and other network entities, such as RSUs, using V2X communications on one or more sidelink channels over a PC5 interface.

Additionally, as illustrated, operations 700 may also be performed by a network entity 702 associated with or serving the environment 701. In some cases, the network entity 702 may be an example of the BS 102 illustrated in FIGS. 1 and 2 or the RSU 410 illustrated in FIGS. 4A and 4B.

Operations 700 begin at 705 with the first vehicle 704 transmitting, based on a transmission configuration, one or more first signals of a plurality of signals in an environment via the radar device in a first frame of a plurality of frames according to a first delay value occurring after a frame prior to the first frame. In some cases, the plurality of signals may include FMCW signals, such as the one or more chirps 520 transmitted in the plurality of frames (e.g., frame interval #1-3) illustrated in FIG. 5B. In some cases, the transmission configuration may comprise a common transmission configuration for use (e.g., by apparatuses, such as vehicles) within the environment 701, as noted above.

Thereafter, as shown at 710, the first vehicle 704 transmits, based on the transmission configuration, one or more second signals via the radar device in at least a second frame of the plurality of frames. The one or more second signals may be transmitted via the radar device according to a second delay value occurring after the first frame, which is different from the first delay value.

Additional Aspects Regarding the Common Transmission Configuration

As noted above, the first vehicle 704 may use a transmission configuration for transmitting the one or more first signals and one or more second signals. This transmission configuration may be common among the vehicles within the environment 701. In other words, first vehicle 704, the second vehicle 706, and the third vehicle 708 may all use a common transmission configuration within the environment 701 when generating and transmitting signals from their respective radar devices.

In some cases, transmission configuration comprises a set of parameters for generating and transmitting the plurality of signals by, for example, the first vehicle 704. The set of parameters include one or more of: a duration associated with the plurality of signals, a duration of at least one of frequency ramp up or a frequency ramp down associated with the plurality of signals, a duration of an inactive period between transmission of signals of the plurality of signals, a number of the plurality of signals for transmission each of the plurality of frames (e.g., including the one or more first signals to be transmitted during the first frame or a number of one or more second signals to be transmitted during the second frame), a carrier frequency associated with the radar device, or a frequency sweep or a bandwidth associated with the plurality of signals.

Coordination of the transmission configuration between vehicles in the environment 701, such as the first vehicle 704, the second vehicle 706, and the third vehicle 708, may occur in different manners. For example, a first manner of coordinating the transmission configuration between the vehicles in the environment 701 may include using a default or fallback configuration that the radar devices of these vehicles will use if no other alternative has been indicated. In other words, the transmission configuration for use in the environment 701 may include a default or fallback configuration.

In some cases, the default configuration that is used as the common transmission configuration may depend on at least one of a geographical area of the environment. For example, in some cases, based on the first vehicle 704 being in a particular geographical area, the first vehicle 704 may decide to use a corresponding default configuration as the common transmission configuration for transmitting the one or more first signals and the one or more second signals. Likewise, the second vehicle 706 and third vehicle 708 may also use the default configuration as the transmission configuration for transmitting signals from their own radar devices based on the second vehicle 706 and third vehicle 708 operating in a geographical area of the environment 701. In some cases, the transmission configuration may be different for different geographical areas.

In some cases, a network entity, such as the network entity 702, may transmit signaling indicating the transmission configuration to use (or the default configuration to use as the transmission configuration). As shown in FIG. 7, the signaling indicating the (default) transmission configuration may be received by the first vehicle 704 (as well as the second vehicle 706 and the third vehicle 708) at 715. In some cases, the signaling indicating the (default) transmission configuration may be transmitted by the network entity 702 (and received by the first vehicle 704) in at least one of a payload of a vehicle-to-everything (V2X) packet, a radar-dedicated signal comprising a preconfigured payload type and size, a sidelink control information (SCI) message, a media access control—control element (MAC-CE) message, or a radio resource control (RRC) message. In some cases, the signaling indicating the transmission configuration may be transmitted by the network entity 702 according to a pre-configured periodicity.

In some cases, the default configuration to use as the transmission configuration may be selected from a transmission configuration codebook that includes a plurality of different transmission configurations. For example, in some cases, the first vehicle 704 may select the (default) transmission configuration from the transmission configuration codebook based on one or more criteria, such as measurements performed by the first vehicle 704, a speed associated with the first vehicle 704, and/or a geographical area of the environment 701 (e.g., a geographical location of the first vehicle 704 within the environment 701). In some cases, the measurements may include at least one of channel busy ratio (CBR) measurements, measurements indicating a number of unique identifiers (IDs) associated with vehicles operating in the environment 701, one or more measurements indicating an energy sensed on a radar-dedicated frequency band, or one or more measurements indicating a density of vehicles in the environment 701 based on one or more sensors other than the radar device. In such cases, it may be assumed that the vehicles within the environment 701 may each perform similar measurements resulting in the same transmission configuration being used among the vehicles in the environment 701.

A second manner in which the transmission configuration may be coordinated among the vehicles in the environment 701 may involve the network entity 702 determining the transmission configuration for use in the environment 701 based on one or more real-time or short-term measurements. For example, in contrast to transmitting signaling periodically indicating a default transmission configuration to use within the environment 701, the network entity 702 may use the one or more real-time/short-term measurements to determine a more optimal transmission configuration for use in the environment 701.

In some cases, as shown at 720 in FIG. 7, the one or more measurements may be performed by the network entity 702. The one or more measurements may include at least one of CBR measurements, measurements indicating a number of unique IDs associated with vehicles operating in the environment 701, one or more measurements indicating an energy sensed on a radar-dedicated frequency band, or one or more measurements indicating a density of vehicles in the environment based on one or more sensors (e.g., video feeds, pneumatic road tubes, etc.).

In some cases, at illustrated at 725 in FIG. 7, the one or more measurements may be performed by one or more of the vehicles in the environment 701, such as the first vehicle 704. The one or more measurements performed by the first vehicle 704 may be similar to those performed by the network entity 702. Thereafter, as illustrated at 730 in FIG. 7, the first vehicle 704 transmits information indicating the one or more measurements to the network entity 702.

Based on the one or more measurements (e.g., performed by at least one of the network entity 702 or the first vehicle 704), the network entity 702 may determine the transmission configuration, including the set of parameters, that match or correspond to conditions in the environment 701 experienced by the radar devices of the vehicles (e.g., as indicated by the one or more measurements). The network entity 702 may then transmit signaling indicating the determined transmission configuration to the vehicles in the environment 701, such as the first vehicle 704. For example, the network entity 702 may transmit the indication of the determined transmission configuration within the signaling transmitted at 715 in FIG. 7. As noted above, the signaling transmitted at 715 may include at least one of payload of a V2X packet, a radar-dedicated signal comprising a preconfigured payload type and size, an SCI message, a MAC-CE message, or an RRC message.

In some cases, the signaling indicating the identified transmission configuration may include an index of the identified transmission configuration within a transmission configuration codebook that include a plurality of different transmission configurations each associated with a unique index. The first vehicle 704 may receive the index of the identified transmission configuration and use the index to look up the identified transmission configuration within the transmission configuration codebook. In some cases, the transmission configuration codebook may be pre-configured in first vehicle 704, for example, by a manufacturer, a network operator, or the like. In some cases, the transmission configuration codebook may be transmitted by the network entity 702 to the first vehicle 704.

A third manner in which the transmission configuration may be coordinated among the vehicles in the environment 701 may involve allowing the vehicles within the environment 701 to each determine one or more supported (or recommended) transmission configurations and to negotiate with each other to determine the transmission configuration to use within the environment 701. For example, because not all vehicles within the environment 701 may support (or recommend) the same transmission configurations, the vehicles within the environment 701 may transmit information among each other indicating transmission configurations supported/recommended by each of the vehicles.

For example, as shown at 735 in FIG. 7, the first vehicle transmits one or more first messages to the second vehicle 706 and the third vehicle 708 in the environment 701, indicating a first set of transmission configurations supported by the radar device of the first vehicle 704. In some cases, the one or more first messages may comprise at least one of a V2X packet, an SCI message, a MAC-CE message, or an RRC message. In some cases, the one or more first messages may comprise groupcast message that is broadcast to all vehicles in the environment 701 (e.g., including the second vehicle 706 and the third vehicle 708) or may comprise a unicast message transmitted only to one other vehicle in the environment 701 (e.g., the second vehicle 706 or the third vehicle 708).

In some cases, the first set of transmission configurations may include only one recommended transmission configuration supported by the first vehicle 704 or may include multiple transmission configurations supported and recommended by the first vehicle 704. In some cases, when multiple transmission configurations are indicated within the first set of transmission configurations, the transmission configurations within the first set of transmission configurations may be ranked or prioritized in a particular manner. For example, a first transmission configuration within the first set of transmission configurations may be associated with a highest priority while a last listed transmission configuration within the first set of transmission configurations may be associated with a lowest priority. In some cases, the different priorities may be associated with or indicate how optimal a corresponding transmission configuration is for use in the environment 701. For example, high priority transmission configurations be more optimal for use within the environment 701 (e.g., perform better based on current conditions within the environment 701) as compared to lower priority transmission configurations.

Thereafter, as illustrated at 740 in FIG. 7, the first vehicle 704 receives one or more second messages from the second vehicle 706 and the third vehicle 708 in the environment 701. The one or more second messages may indicate one or more second sets of transmission configurations supported by radar devices of the second vehicle 706 and the third vehicle 708 in the environment 701. In some cases, transmitting the first message and receiving the one or more second messages may be performed periodically or triggered based on at least one criterion. For example, in some cases, the first vehicle 704 may be triggered to transmit the first message in response to receiving another message from another vehicle in the environment 701 indicating a third set of transmission configurations supported by a radar device of this other vehicle.

As with the first message, the one or more second messages may include groupcast or unicast messages. Additionally, as with the first message, the one or more second sets of transmission configurations may each include only one recommended transmission configuration supported by the second vehicle 706 and/or the third vehicle 708 or may include multiple transmission configurations supported and recommended by the second vehicle 706 and/or the third vehicle 708. Again, when the one or more second sets of transmission configurations include multiple supported/recommended transmission configurations, the included transmission configurations may be ranked or prioritized in a particular manner as described above.

In some cases, the transmission configuration indicated most often in the first set of transmission configurations and the one or more second sets of transmission configurations may be selected by the vehicles, including the first vehicle 704, for use in the environment 701. In some cases, if the first set of transmission configurations and the one or more second sets of transmission configurations each include only one recommended/supported transmission configuration and that recommended/supported transmission configuration is the same within each of the first set of transmission configurations and the one or more second sets of transmission configurations, no additional signaling may be required between the vehicles within the environment 701 to indicate which transmission configuration is selected for use.

In some cases, the rank or priority associated with the transmission configurations included within the first set of transmission configurations and the one or more second sets of transmission configurations may be taken into account when selecting the transmission configuration to use within the environment 701. For example, in some cases, the transmission configuration that is most often indicated within the first set of transmission configurations and the one or more second sets of transmission configurations and that has the highest priority or rank may be selected for use within the environment 701. In some cases, selecting the transmission configuration that is most often indicated and with the highest rank or priority may allow for the most optimal transmission configuration (e.g., based on current channel conditions within the environment 701, for example, as determined by the one or more measurements described above) to be used within the environment 701.

In some cases, when the environment 701 is served by the network entity 702, the network entity 702 may additionally receive the one or more first messages (e.g., including the first set of transmission configurations) and one or more second messages (e.g., including the one or more second sets of transmission configurations). In such cases, the network entity 702 may determine the most often indicated transmission configuration (or most often indicated and highest ranked transmission configuration) within the first set of transmission configurations and the one or more second sets of transmission configurations, which can be signaled to the vehicles 704, 706, and 708 within the signaling transmitted at 715 in FIG. 7.

Additional Aspects Regarding Frame Delay Values

According to aspects, the common transmission configuration, when employed by radar devices of multiple vehicles (e.g., the vehicles 704, 706, and 708) within the environment 701 may ensure that all signals generated by these radar devices are the same. As noted above, having all of the signals transmitted by radar devices within the environment 701 may help to reduce or eliminate broadband noise increase within the environment 701, which is a primary cause of misdetected objects within environments. While having all of the signals transmitted by radar devices within the environment 701 may help to reduce broadband noise, these signals may result in many ghost target detections.

For example, assuming that the first vehicle 704, the second vehicle 706, and the third vehicle 708 all use a common transmission configuration, when the first vehicle 704 transmits the one or more first signals at 710 in FIG. 7 and the one or more second signals at 715 in FIG. 7, these signals may be directly received by the second vehicle 706 and third vehicle 708, as shown in FIG. 7. In such cases, the one or more first signals and one or more second signals from the first vehicle 704 may be considered interfering signals and may appear as ghost targets to the second vehicle 706 and third vehicle 708.

Similarly, interfering signals transmitted by the second vehicle 706 and third vehicle 708 that are received by the first vehicle 704 may appear as ghost targets to the first vehicle 704. For example, the interfering signals transmitted by the second vehicle 706 and third vehicle 708 may appear to the first vehicle 704 as a delayed version of its own transmissions with an effective propagation delay equal to the sum of an actual propagation delay corresponding to the distance between the vehicles (e.g., between the first vehicle 704 and the second vehicle 706 and/or third vehicle 708) and the time offset/difference between the transmission signals in frames corresponding to each of the vehicles. Assuming that the interfering second vehicle 706 and/or third vehicle 708 initiated transmissions of signals within at least one third frame (e.g., different from the first and second frame used for the one or more first and second signals transmitted by the first vehicle 704) with an offset 8 (e.g., which can be greater or smaller than zero) with respect to the time of the first frame or second frame in which the first vehicle 704 transmits the one or more first signals and one or more second signals, the propagation delay seen by first vehicle 704 for the incoming interfering signals from the second vehicle 706 and/or third vehicle 708 may be equal to d/c+δ, where d is the distance between the first vehicle 704 and the interfering second or third vehicles 706, 708 at the time that the at least one third frame including the interfering signals was transmitted by interfering second or third vehicles 706, 708.

However, because the first vehicle 704 perceives the interfering signals from the second vehicle 706 and/or the third vehicle 708 as signals that itself transmitted (e.g., which normally have a propagation delay of τ=2d/c, where d would be either the distance between the second vehicle 706 or third vehicle 708 and the first vehicle 704 and), the radar device of the first vehicle 704 will perceive the propagation delay of the interfering signals received from the second vehicle 704 and/or the third vehicle 708 as c(d/c+δ)/2. In other words, the first vehicle 704 will perceive the ghost targets associated with the interfering signals from the second vehicle 704 and/or the third vehicle 708 at a greater distance than where the second vehicle 704 and/or the third vehicle 708 are actually located, which can lead to autonomous driving applications to malfunction and to catastrophic events.

Further, if the radar devices of all of the vehicles within the environment 701 transmit their frames back-to-back with a fixed frame period, a frame offset between the radar devices of the interfering second/third vehicles 706/708 and the radar device of the first vehicle 704 will always be equal to δ for all frames. This will result in the radar device of the first vehicle 704 consistently detecting the ghost targets in each frame at the same distance with small perturbations depending on the interfering vehicle's movement. As a time series of these ghost target detections is highly correlated in time, the association/tracking filter of the radar device of the first vehicle 704 that processes the detections in frames will create a "ghost track" that is persistent for as long as the interfering vehicle (e.g., second vehicle 706 and/or third vehicle 708) is received by the first vehicle 704.

However, if this time series of ghost detections corresponds to unrealistic movement, the association/tracking filter of the radar device of the first vehicle 704 will naturally discard these ghost detections as false alarms as the ghost detections would not be associated to any existing track (and would not trigger the creation of new track). Accordingly, as noted above, to allow vehicles better distinguish and discard ghost targets, different delay values may be applied between the frames in which signals are transmitted by radar devices. These different delay values may be selected such that a resulting time offset between concurrently transmitted frames by a pair of vehicles, such as the first vehicle 704 and second vehicle 706, makes the first vehicle 704 appear to the second vehicle 706 as moving in an unrealistic manner, such as moving above a threshold amount of distance in a short period of time (e.g., a time between transmissions in successive frames of the second vehicle 706). For example, assume a frame offset between two successive frames of a given pair of vehicles (e.g., resulting from a delay value applied to one of the frames) differs by 1 microsecond. This would translates to a jump of 150 meters between the successive frames for the ghost detections. With a frame duration in an order of a few milliseconds, this different in delays translates to unrealistic movement that will be filtered out by the association/tracking filter of a radar device.

Figure 8:
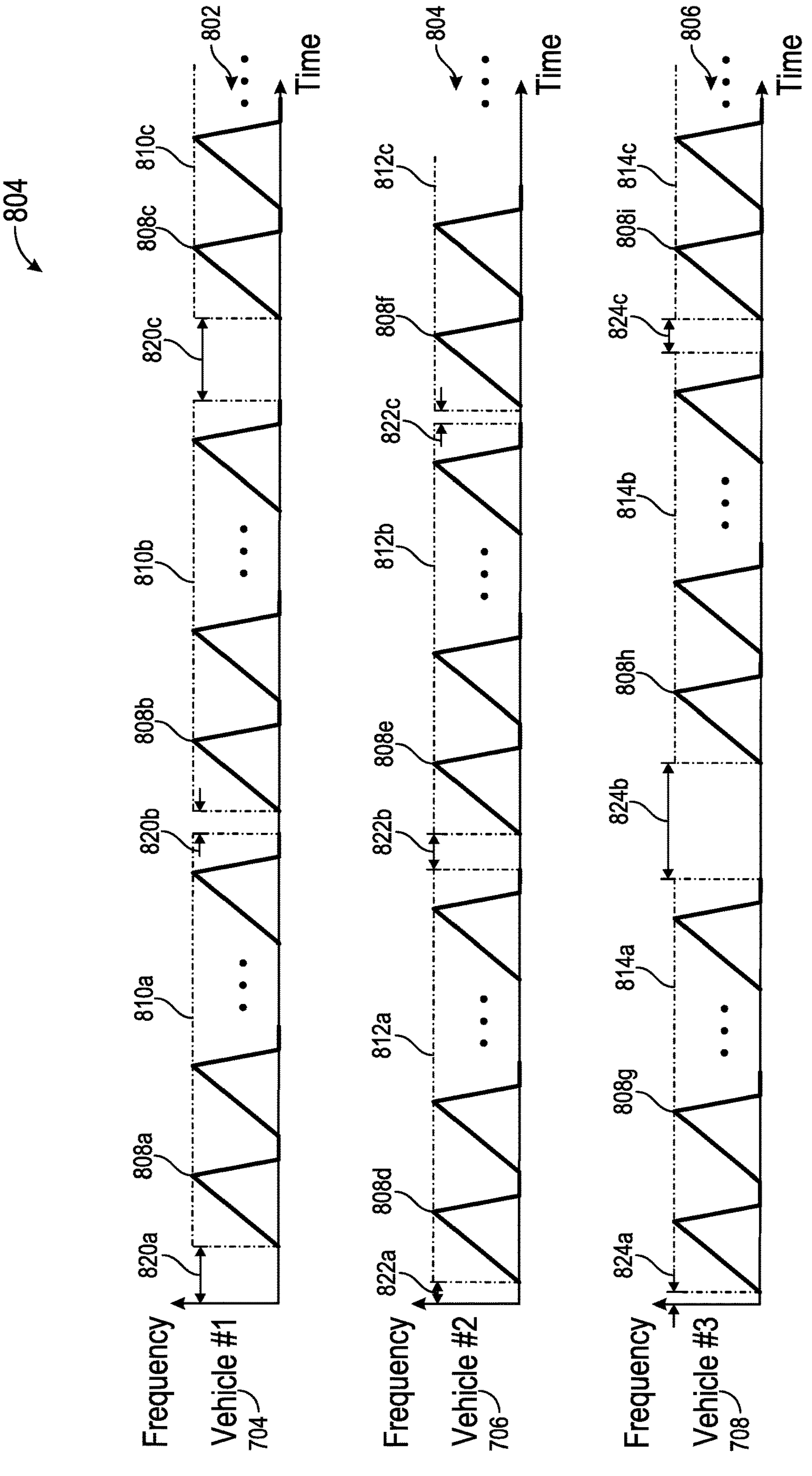
FIG. 8 illustrates example time and frequency plots showing differing delay values between successive frames associated with vehicles in an environment.

FIG. 8 illustrates example time and frequency plots showing differing delay values between successive frames associated with the first vehicle 704, the second vehicle 706, and the third vehicle 708 in the environment 701. As shown, the first vehicle 704 transmits (e.g., via its radar device and based on the common transmission configuration) one or more first signals 808*a* in a first frame 810*a*, one or more second signals 808*b* in a second frame 810*b*, and one or more third signals 808*c* in a third frame 810*c*. Similarly, the second vehicle 706 transmits (e.g., via its radar device and based on the common transmission configuration) one or more fourth signals 808*d* in a fourth frame 812*a*, one or more fifth signals 808*e* in a fifth frame 812*b*, and one or more sixth signals 808*f* in a sixth frame 812*c*. Further, as shown, the third vehicle 708 transmits (e.g., via its radar device and based on the common transmission configuration) one or more seventh signals 808*g* in a seventh frame 814*a*, one or more eighth signals 808*h* in an eighth frame 814*b*, and one or more ninth signals 808*i* in a ninth frame 814*c*.

As noted above, to help vehicles in the environment 701 to better detect and discard ghost targets (e.g., since each vehicle in the environment 701 uses the same transmission configuration), different delay values may be applied between frames when transmitting signals via radar devices. For example, as shown in FIG. 8, the first vehicle 704 transmits the one or more first signals 808*a* in the first frame 810*a* according to a first delay value 820*a* occurring after a frame prior to the first frame 810*a*. Thereafter, the first vehicle 704 transmits the one or more second signals 808*b* in the second frame 810*b* according to a second delay value 820*b* value occurring after the first frame 810*a*. As shown, the second delay value 820*b* is different from the first delay value 820*a*. Further, as shown, the first vehicle 704 also transmits the one or more third signals 808*c* in the third frame 810*c* according to a third delay value 820*c*, which is different from both the first delay value 820*a* and second delay value 820*b*.

When the one or more first signals 808*a* transmitted in the first frame 810*a* and the one or more second signals 808*b* transmitted in the second frame 810*b* are received by the second vehicle 706 and/or third vehicle 708, the difference between delay values 820*a*-820*c* may make it appear to the second vehicle 706 and/or third vehicle 708 that the first vehicle 704 has moved an unrealistically large distance (e.g., 150 meters) in a short amount of time (e.g., 1 millisecond). As a result, the association/tracking filters of the radar devices of the second vehicle 706 and/or third vehicle 708 may attribute any ghost detections associated with the first vehicle 704 as false alarms and readily discard these ghost detections.

Similarly, the second vehicle 706 and third vehicle 708 may use different delay values between the frames 812*a*-812*c* and 814*a*-814*c*, respectively. For example, as shown the second vehicle 706 uses a fourth delay value 822*a* prior to the fourth frame 812*a*, a fifth delay value between the fourth frame 812*a* and the fifth frame 812*b*, and a sixth delay value between the fifth frame 812*b* and the sixth frame 812*c*. Likewise, the third vehicle 708 uses a seventh delay value 824*a* prior to the seventh frame 814*a*, an eighth delay value between the seventh frame 814*a* and the eighth frame 814*b*, and a ninth delay value between the eighth frame 814*b* and the ninth frame 814*c*. As with the first vehicle 704 above, the delay values 822*a*-822*c* and 824*a*-824*c* may make it appear to the first vehicle 704 that the second vehicle 706 and third vehicle 708, respectively, are moving an unrealistically large distance in a short amount of time. As such, the association/tracking filter of the radar device of the first vehicle 704 may attribute any ghost detections associated with the second vehicle 706 and third vehicle 708 as false alarms and readily discard these ghost detections.

In some cases, with respect to the first vehicle 704, to ensure that ghost detections associated with the first vehicle 704 may be readily discarded by the second vehicle 706 and/or third vehicle 708, the delay values (e.g., delay values 820*a*-820*c*) used by the first vehicle 704 between the first frame 810*a*, second frame 810*b*, and third frame 810*c* should be different from each other by a threshold amount. For example, in some cases, if the second delay value 820*b* is not different from the first delay value 820*a* by the threshold amount, the second vehicle 706 and/or third vehicle 708 may not be able to readily discard a ghost detection associated with the first vehicle 704 as, in this case, the first vehicle 704 would not appear to be moving unrealistically.

The delay values to be used between frames may be determined in different manners. In some cases, the vehicles in the environment 701 (e.g., including the first vehicle 704) may independently and randomly select a different delay value to apply between frames of the plurality of frames. In other words, the delay values 820*a*-820*c*, 822*a*-822*c*, and 824*a*-824*c* may each be independently and randomly selected by the vehicles 704, 706, and 708. According to aspects, the randomly selected different delay values may within a range between no delay and a maximum delay value ($\delta_{max}$). In some cases, $\delta_{max}$ may be selected to be large enough so that resulting relative frame offsets between pairs of interfering vehicles (e.g., vehicles 704, 706, and 708) varies significantly so that corresponding ghost targets/detections may be filtered out. In some cases, $\delta_{max}$ may be pre-configured or provided real-time by the network entity 702 (e.g., via V2X signaling/messages).

In some cases, delay values (e.g., delay values 820*a*-820*c*, 822*a*-822*c*, and 824*a*-824*c*) used by the vehicles in the environment 701 may be different between each frame according to a delay value pattern. In other words, the particular delay values that any one vehicle uses between frames may be based on a delay value pattern. In some cases, different vehicles may use different delay value patterns. For example, in some cases, the first vehicle 704 may use a first delay value patter (including a pattern of different delay values to be used between the frames 810*a*-810*c*), which may be different from a second delay value pattern used by the second vehicle 706 (e.g., which includes another pattern of different delay values to be used between the frames 812*a*-812*c*).

In some cases, the first vehicle 704 may select a particular delay value pattern to use from a delay value pattern codebook, which includes a plurality of different delay value patterns. In some cases, this delay value pattern codebook may be pre-configured in the first vehicle 704. Further, in some cases, multiple delay value pattern codebooks may be configured and used. In some cases, which delay value pattern codebook to select and which delay value pattern from the selected delay value pattern codebook to use may be pre-configured or indicated real time by the network entity 702 (e.g., via V2X signaling/messaging). For example, in some cases, the first vehicle 704 may receive signaling from the network entity 702, indicating a delay value pattern codebook to consider and a delay value pattern to use from this delay value pattern codebook.

According to aspects, by using the techniques described above, such as the common transmission configuration and different delay values between frames, vehicles within the environment 701 may be able to easily detect and discard ghost targets. An example of this process is described below. For example, in some cases, the first vehicle 704 may maintaining a list of a plurality of radar targets. Further, the first vehicle 704 may receive one or more third signals in the first frame associated with one or more radar targets in the environment 701, such as the second vehicle 706 and/or the third vehicle 708. The first vehicle 704 may also receive one or more fourth signals in the second frame associated with the one or more radar targets. Thereafter, the first vehicle may determine, based on a first receive time associated with the one or more third signals and a second receive time associated with one or more fourth signals, that a distance traveled by the one or more radar targets during a period between the first receive time and the second receive time is greater than a threshold. Accordingly, in response to the determination that the distance traveled by the one or more radar targets during the period between the first receive time and the second receive time is greater than a threshold, the first vehicle 704 may remove the one or more radar targets from the list of the plurality of radar targets.

Example Methods for Coordinating Waveform Parameters and Frame Delays for Multi-Radar Coexistence FIG. 9 is a flow diagram illustrating example operations 900 for wireless communication, in accordance with certain aspects of the present disclosure. The operations 900 may be performed, for example, by an apparatus comprising a radar device for coordinating waveform parameters and frame delays for multi-radar coexistence. In some cases, the apparatus may include a vehicle, such as one or more of the vehicles 402, 404, 452, 454, 502, 504, 604, 704, 706, or 708. In some cases, the apparatus may include a UE (e.g., such as the UE 104 in the wireless communication network 100 of FIG. 1) included within a vehicle. The operations 900 may be implemented as software components that are executed and run on one or more processors (e.g., controller/processor 280 of FIG. 2). Further, the transmission and reception of signals by the apparatus in operations 900 may be enabled, for example, by one or more antennas (e.g., antennas 252 of FIG. 2). In certain aspects, the transmission and/or reception of signals by the apparatus may be implemented via a bus interface of one or more processors (e.g., controller/processor 280, including the radar configuration component 281) obtaining and/or outputting signals.

The operations 900 begin, in block 910, with the apparatus transmitting, based on a transmission configuration, one or more first signals of a plurality of signals in an environment via the radar device in a first frame of a plurality of frames according to a first delay value occurring after a frame prior to the first frame. In some cases, the transmission configuration comprises a common transmission configuration for use in the environment.

In block 920, the apparatus transmits one or more second signals via the radar device in at least a second frame of the plurality of frames according to a second delay value occurring after the first frame based on the transmission configuration. In some cases, the second delay value is different from the first delay value.

In some cases, the transmission configuration comprises a set of parameters for generating and transmitting the plurality of signals, including the one or more first signals and the one or more second signals.

In some cases, the set of parameters comprise one or more of: a duration associated with the plurality of signals, a duration of a frequency ramp up and a frequency ramp down associated with the plurality of signals, a duration of an inactive period between transmission of signals of the plurality of signals, a number of the one or more first signals to be transmitted during the first frame or a number of the one or more second signals to be transmitted during the second frame, a carrier frequency associated with the radar device, or a frequency sweep or a bandwidth associated with the plurality of signals.

In some cases, the transmission configuration depends on a geographical area of the environment and the transmission configuration is different for different geographical areas.

In some cases, the transmission configuration depends on a speed of the radar device.

In some cases, operations 900 further include receiving signaling indicating the transmission configuration from a network entity.

In some cases, the signaling indicating the transmission configuration comprises an index associated with a transmission configuration codebook, the transmission configuration codebook including a plurality of different transmission configurations. Further, in some cases, operations 900 further include selecting the transmission configuration from the transmission configuration codebook based on the index.

In some cases, operations 900 further include selecting the transmission configuration from a transmission configuration codebook (e.g., irrespective of signaling received from the network entity). In some cases, selecting the transmission configuration from the transmission configuration codebook is based on at least one of a geographical area of the environment.

In some cases, the signaling indicating the transmission configuration is received from the network entity in at least one of: a vehicle-to-everything (V2X) packet, a radar-dedicated signal comprising a preconfigured payload type and size, a sidelink control information (SCI) message, a media access control—control element (MAC-CE) message, or a radio resource control (RRC) message.

In some cases, operations 900 further include performing one or more measurements, wherein the one or more measurements comprise at least one of: channel busy ratio (CBR) measurements, measurements indicating a number of unique UE identifiers (IDs) associated with UEs operating in the environment, one or more measurements indicating an energy sensed on a radar-dedicated frequency band, or one or more measurements indicating a density of UEs in the environment based on one or more sensors other than the radar device.

In some cases, operations 900 further include transmitting information indicating the one or more measurements to the network entity, wherein the signaling indicating the transmission configuration received from the network entity is based on the information indicating the one or more measurements.

In some cases, operations 900 further include transmitting a first message to a second apparatus in the environment, the first message indicating a first set of transmission configurations supported by the radar device of the apparatus; and receiving one or more second messages from one or more other apparatuses in the environment, the one or more second messages indicating one or more second sets of transmission configurations supported by radar devices of the one or more other apparatuses in the environment.

In some cases, the transmission configuration comprises a transmission configuration most indicated in the first set of transmission configurations and the one or more second sets of transmission configurations. In such cases, operations 900 further include receiving an indication from a network entity indicating the transmission configuration.

In some cases, transmitting the first message and receiving the one or more second messages is performed periodically or triggered based on at least one criterion.

In some cases, at least one of the first message or the one or more second messages comprises at least one of: a vehicle-to-everything (V2X) packet, a sidelink control information (SCI) message, a media access control—control element (MAC-CE) message, or a radio resource control (RRC) message.

In some cases, the first message comprises a groupcast message broadcast to multiple other apparatuses, including the second apparatus, in the environment or a unicast message transmitted only to the second apparatus.

In some cases, the second delay value different from the first delay value by a threshold amount of time.

In some cases, delay values, including at least the first delay value and the second delay value, are different between each frame of a set of frames of the plurality of frames, including at least the first frame and the second frame, according to a delay value pattern. In some cases, the delay value pattern is different from other delay value patterns for use by other apparatuses in the environment. In some cases, operations 900 further include selecting the delay value pattern from a plurality of delay patterns.

In some cases, operations 900 further include receiving an indication, from a network entity, of the delay value pattern to select from the plurality of delay patterns.

In some cases, operations 900 further include randomly selecting a different delay value to apply between frames of the plurality of frames, wherein the randomly selected different delay values are within a range between no delay and a maximum delay value.

In some cases, operations 900 further include maintaining a list of a plurality of radar targets, receiving one or more third signals in the first frame associated with one or more radar targets, receiving one or more fourth signals in the second frame associated with the one or more radar targets, determining, based on a first receive time associated with the one or more third signals and a second receive time associated with one or more fourth signals, that a distance traveled by the one or more radar targets during a period between the first receive time and the second receive time is greater than a threshold, and removing the one or more radar targets from the list of the plurality of radar targets.

FIG. 10 is a flow diagram illustrating example operations 1000 for wireless communication. The operations 1000 may be performed, for example, by a network entity for coordinating waveform parameters and frame delays for multi-radar coexistence. In some cases, the network entity may include a BS (e.g., such as the BS 102 in the wireless communication network 100 of FIG. 1) or an RSU (e.g., such as the RSU 410 illustrated in FIG. 4). The operations 1000 may be implemented as software components that are executed and run on one or more processors (e.g., controller/processor 240 of FIG. 2). Further, the transmission and reception of signals by the network entity in operations 1000 may be enabled, for example, by one or more antennas (e.g., antennas 234 of FIG. 2). In certain aspects, the transmission and/or reception of signals by the network entity may be implemented via a bus interface of one or more processors (e.g., controller/processor 240, including the radar configuration component 241) obtaining and/or outputting signals.

The operations 1000 begin at 1010 with obtaining one or more measurements associated with an environment that includes a plurality of apparatuses.

In block 1020, the network entity determines, based on the one or more measurements, a transmission configuration for transmitting one or more signals of a plurality of signals via a radar device in a plurality of frames, wherein the transmission configuration comprises a common transmission configuration for use in the environment.

In block 1030, the network entity transmits signaling indicating the transmission configuration to one or more apparatuses of the plurality of apparatuses.

In some cases, the transmission configuration comprises a set of parameters for generating and transmitting the plurality of signals, including the one or more first signals and the one or more second signals.

In some cases, the set of parameters comprise one or more of: a duration associated with the plurality of signals, a duration of a frequency ramp up and a frequency ramp down associated with the plurality of signals, a duration of an inactive period between transmission of signals of the plurality of signals, a number of signals of the plurality of signals to be transmitted during a frame of the plurality of frames, a carrier frequency associated with the radar device, or a frequency sweep or a bandwidth associated with the plurality of signals.

In some cases, the transmission configuration depends on a geographical area of the environment and the transmission configuration is different for different geographical areas.

In some cases, the signaling indicating the transmission configuration comprises an index associated with a transmission configuration codebook, the transmission configuration codebook including a plurality of different transmission configurations.

In some cases, the transmission configuration codebook is based on at least one of a geographical area of the environment.

In some cases, the signaling indicating the transmission configuration is received from the network entity in at least one of: a vehicle-to-everything (V2X) packet, a radar-dedicated signal comprising a preconfigured payload type and size, a sidelink control information (SCI) message, a media access control—control element (MAC-CE) message, or a radio resource control (RRC) message.

In some cases, obtaining the one or more measurements comprises performing the one or more measurements, wherein the one or more measurements comprise at least one of: channel busy ratio (CBR) measurements, measurements indicating a number of unique identifiers (IDs) associated with the plurality of apparatuses operating in the environment, one or more measurements indicating an energy sensed on a radar-dedicated frequency band, or one or more measurements indicating a density of plurality of apparatuses in the environment based on one or more sensors.

In some cases, obtaining the one or more measurements comprises receiving information indicating the one or more measurements from the one or more apparatuses of the plurality of apparatuses.

In some cases, operations 1000 further include receiving one or more messages from the one or more apparatuses in the environment, the one or more messages indicating one or more sets of transmission configurations supported by radar devices of the one or more apparatuses in the environment, wherein the determined transmission configuration comprises a transmission configuration most indicated in the one or more sets of transmission configurations.

In some cases, operations 1000 further include transmitting, to the one or more apparatuses, an indication of a delay value pattern to select from the plurality of delay patterns for use between frames of the plurality of frames. In some cases, operations 1000 further include transmitting, to the one or more apparatuses, an indication of the plurality of delay patterns.

Example Wireless Communication Devices

Figure 11:
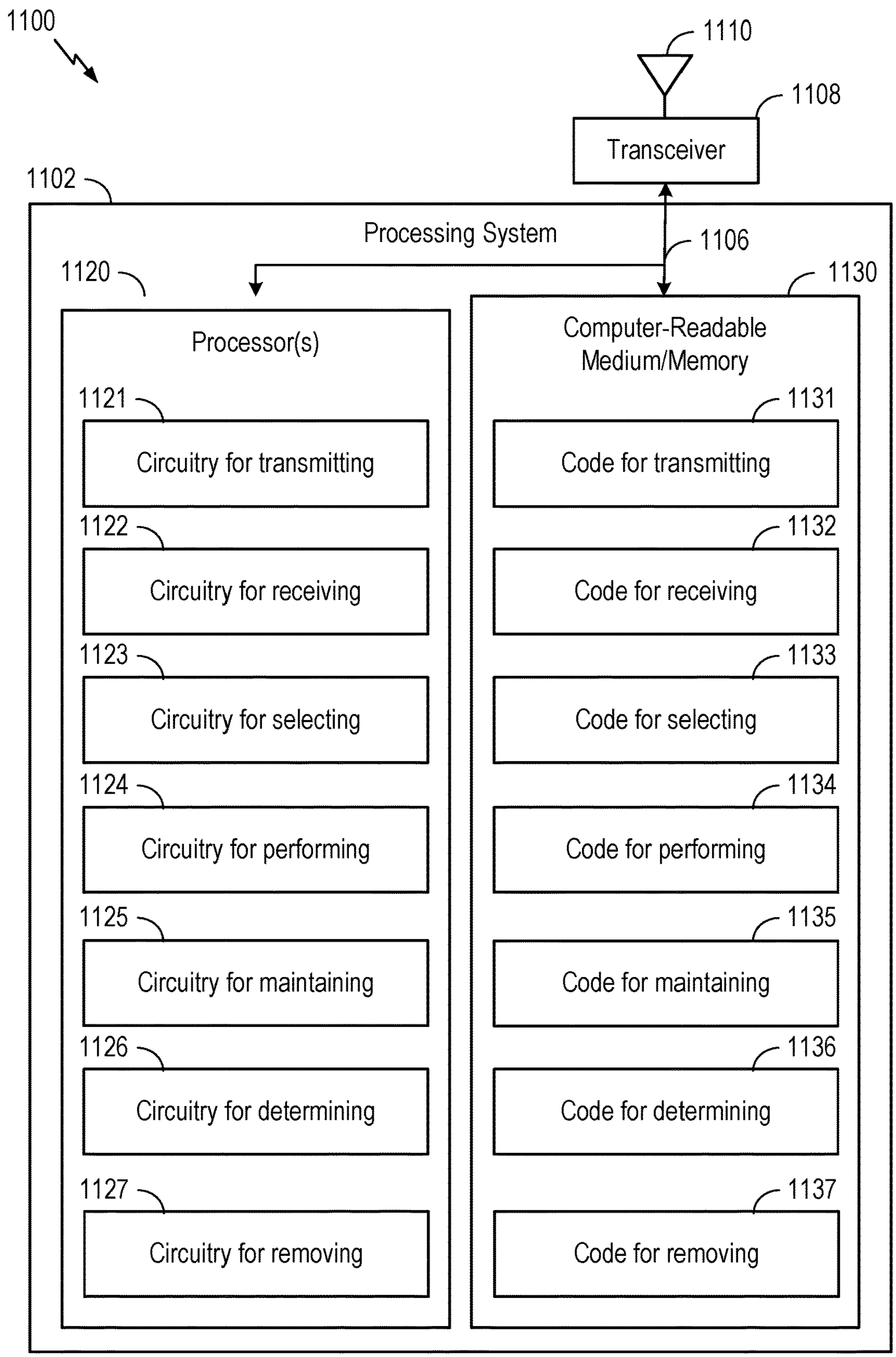
FIG. 11 depicts aspects of an example communications device.

FIG. 11 depicts an example communications device 1100 that includes various components operable, configured, or adapted to perform operations for the techniques disclosed herein, such as the operations depicted and described with respect to FIGS. 7 and 10. In some examples, communication device 1100 may be a network entity, such as the BS 102 as described, for example with respect to FIGS. 1 and 2.

Communications device 1100 includes a processing system 1102 coupled to a transceiver 1108 (e.g., a transmitter and/or a receiver). Transceiver 1108 is configured to transmit (or send) and receive signals for the communications device 1100 via an antenna 1110, such as the various signals as described herein. Processing system 1102 may be configured to perform processing functions for communications device 1100, including processing signals received and/or to be transmitted by communications device 1100.

Processing system 1102 includes one or more processors 1120 coupled to a computer-readable medium/memory 1130 via a bus 1106. In certain aspects, computer-readable medium/memory 1130 is configured to store instructions (e.g., computer-executable code) that when executed by the one or more processors 1120, cause the one or more processors 1120 to perform the operations illustrated in FIGS. 7 and 10, or other operations for performing the various techniques discussed herein for coordinating waveform parameters and frame delays for multi-radar coexistence.

In the depicted example, computer-readable medium/memory 1130 stores code 1131 for obtaining, code 1132 for determining, code 1133 for transmitting, code 1134 for performing, and code 1135 for receiving.

In the depicted example, the one or more processors 1120 include circuitry configured to implement the code stored in the computer-readable medium/memory 1130, including circuitry 1121 for obtaining, circuitry 1122 for determining, circuitry 1123 for transmitting, circuitry 1124 for performing, and circuitry 1125 for receiving.

Various components of communications device 1100 may provide means for performing the methods described herein, including with respect to FIGS. 7 and 10.

In some examples, means for transmitting or sending (or means for outputting for transmission) may include the transceivers 232 and/or antenna(s) 234 of the BS 102 illustrated in FIG. 2 and/or transceiver 1108 and antenna 1110 of the communication device 1100 in FIG. 11.

In some examples, means for receiving (or means for obtaining) may include the transceivers 232 and/or antenna(s) 234 of the base station illustrated in FIG. 2 and/or transceiver 1108 and antenna 1110 of the communication device 1100 in FIG. 11.

In some examples, means for determining and means for performing may include various processing system components, such as: the one or more processors 1120 in FIG. 11, or aspects of the BS 102 depicted in FIG. 2, including receive processor 238, transmit processor 220, TX MIMO processor 230, and/or controller/processor 240 (including radar configuration component 241).

Notably, FIG. 11 is an example, and many other examples and configurations of communication device 1100 are possible.

Figure 12:
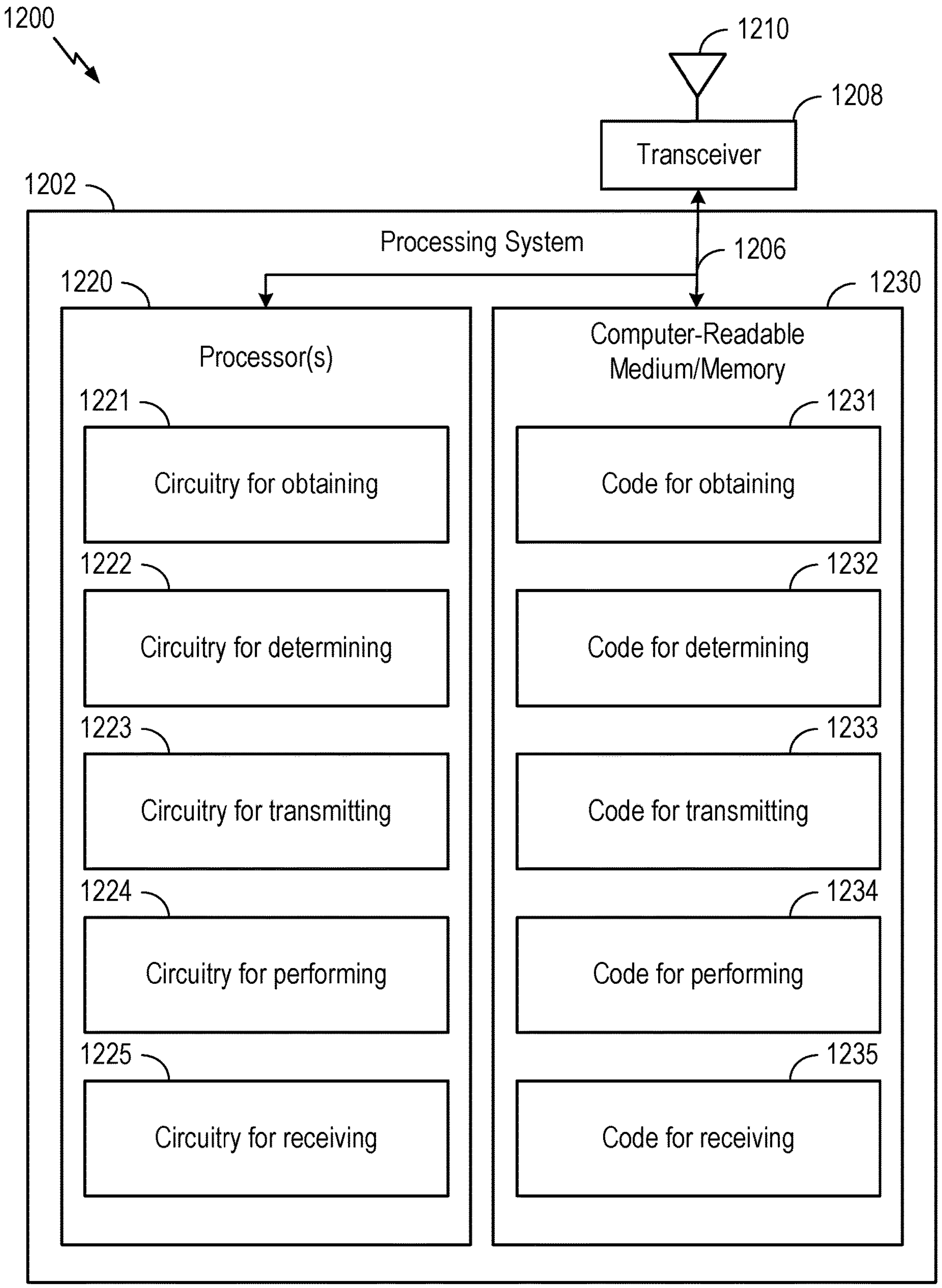
FIG. 12 depicts aspects of an example communications device.

FIG. 12 depicts an example communications device 1200 that includes various components operable, configured, or adapted to perform operations for the techniques disclosed herein, such as the operations depicted and described with respect to FIGS. 7 and 9. In some examples, communication device 1200 may be an apparatus, such as a vehicle that includes a UE 104 as described, for example with respect to FIGS. 1 and 2.

Communications device 1200 includes a processing system 1202 coupled to a transceiver 1208 (e.g., a transmitter and/or a receiver). Transceiver 1208 is configured to transmit (or send) and receive signals for the communications device 1200 via an antenna 1210, such as the various signals as described herein. In some cases, the transceiver 1208 may comprise a radar device capable of transmitting one or more (radar) signals. Processing system 1202 may be configured to perform processing functions for communications device 1200, including processing signals received and/or to be transmitted by communications device 1200.

Processing system 1202 includes one or more processors 1220 coupled to a computer-readable medium/memory 1230 via a bus 1206. In certain aspects, computer-readable medium/memory 1230 is configured to store instructions (e.g., computer-executable code) that when executed by the one or more processors 1220, cause the one or more processors 1220 to perform the operations illustrated in FIGS. 7 and 9, or other operations for performing the various techniques discussed herein for coordinating waveform parameters and frame delays for multi-radar coexistence.

In the depicted example, computer-readable medium/memory 1230 stores code 1231 for transmitting, code 1232 for receiving, code 1233 for selecting, code 1234 for performing, code 1235 for maintaining, code 1236 for determining, and code 1237 for removing.

In the depicted example, the one or more processors 1220 include circuitry configured to implement the code stored in the computer-readable medium/memory 1230, including circuitry 1221 for transmitting, circuitry 1222 for receiving, circuitry 1223 for selecting, circuitry 1224 for performing, circuitry 1225 for maintaining, circuitry 1226 for determining, and circuitry 1227 for removing.

Various components of communications device 1200 may provide means for performing the methods described herein, including with respect to FIGS. 7 and 9.

In some examples, means for transmitting or sending (or means for outputting for transmission) may include the transceivers 254 and/or antenna(s) 252 of the UE 104 illustrated in FIG. 2 and/or transceiver 1208 and antenna 1210 of the communication device 1200 in FIG. 12.

In some examples, means for receiving (or means for obtaining) may include the transceivers 254 and/or antenna (s) 252 of the UE 104 illustrated in FIG. 2 and/or transceiver 1208 and antenna 1210 of the communication device 1200 in FIG. 12.

In some examples, means for selecting, means for performing, means for maintaining, means for determining, and means for removing may include various processing system components, such as: the one or more processors 1220 in FIG. 12, or aspects of the UE 104 depicted in FIG. 2, including receive processor 258, transmit processor 264, TX MIMO processor 266, and/or controller/processor 280 (including radar configuration component 281).

Notably, FIG. 12 is an example, and many other examples and configurations of communication device 1200 are possible.

Example Clauses

Implementation examples are described in the following numbered clauses:

Clause 1: A method performed by an apparatus comprising a radar device, the method comprising: transmitting, based on a transmission configuration, one or more first signals of a plurality of signals in an environment via the radar device in a first frame of a plurality of frames according to a first delay value occurring after a frame prior to the first frame, wherein the transmission configuration comprises a common transmission configuration for use in the environment; and transmitting one or more second signals via the radar device in at least a second frame of the plurality of frames according to a second delay value occurring after the first frame based on the transmission configuration, wherein the second delay value is different from the first delay value.

Clause 2: The method of Clause 1, wherein the transmission configuration comprises a set of parameters for generating and transmitting the plurality of signals, including the one or more first signals and the one or more second signals.

Clause 3: The method of Clause 2, wherein the set of parameters comprise one or more of: a duration associated with the plurality of signals, a duration of a frequency ramp up and a frequency ramp down associated with the plurality of signals, a duration of an inactive period between transmission of signals of the plurality of signals, a number of the one or more first signals to be transmitted during the first frame or a number of the one or more second signals to be transmitted during the second frame, a carrier frequency associated with the radar device, or a frequency sweep or a bandwidth associated with the plurality of signals.

Clause 4: The method of any one of Clauses 1-3, wherein the transmission configuration depends on a geographical area of the environment and the transmission configuration is different for different geographical areas.

Clause 5: The method of any one of Clauses 1-4, wherein the transmission configuration depends on a speed of the radar device.

Clause 6: The method of any one of Clauses 1-5, further comprising receiving signaling indicating the transmission configuration from a network entity.

Clause 7: The method of Clause 6, wherein: the signaling indicating the transmission configuration comprises an index associated with a transmission configuration codebook, the transmission configuration codebook including a plurality of different transmission configurations, and the method further comprises selecting the transmission configuration from the transmission configuration codebook based on the index.

Clause 8: The method of any one of Clauses 6-7, wherein the signaling indicating the transmission configuration is received from the network entity in at least one of: a vehicle-to-everything (V2X) packet, a radar-dedicated signal comprising a preconfigured payload type and size, a sidelink control information (SCI) message, a media access control—control element (MAC-CE) message, or a radio resource control (RRC) message.

Clause 9: The method of any one of Clauses 6-8, further comprising performing one or more measurements, wherein the one or more measurements comprise at least one of: channel busy ratio (CBR) measurements, measurements indicating a number of unique UE identifiers (IDs) associated with UEs operating in the environment, one or more measurements indicating an energy sensed on a radar-dedicated frequency band, or one or more measurements indicating a density of UEs in the environment based on one or more sensors other than the radar device.

Clause 10: The method of Clause 9, further comprising transmitting information indicating the one or more measurements to the network entity, wherein the signaling indicating the transmission configuration received from the network entity is based on the information indicating the one or more measurements.

Clause 11: The method of any one of Clauses 1-5, further comprising selecting the transmission configuration from a transmission configuration codebook.

Clause 12: The method of Clause 11, wherein selecting the transmission configuration from the transmission configuration codebook is based on at least one of a geographical area of the environment.

Clause 13. The method of any one of Clauses 1-5, further comprising: transmitting a first message to a second apparatus in the environment, the first message indicating a first set of transmission configurations supported by the radar device of the apparatus; and receiving one or more second messages from one or more other apparatuses in the environment, the one or more second messages indicating one or more second sets of transmission configurations supported by radar devices of the one or more other apparatuses in the environment.

Clause 14: The method of Clause 13, wherein the transmission configuration comprises a transmission configuration most indicated in the first set of transmission configurations and the one or more second sets of transmission configurations.

Clause 15: The method of Clause 14, further comprising receiving an indication from a network entity indicating the transmission configuration.

Clause 16: The method of any one of Clauses 13-15, wherein transmitting the first message and receiving the one or more second messages is performed periodically or triggered based on at least one criterion.

Clause 17: The method of any one of Clauses 13-16, wherein at least one of the first message or the one or more second messages comprises at least one of: a vehicle-to-everything (V2X) packet, a sidelink control information (SCI) message, a media access control—control element (MAC-CE) message, or a radio resource control (RRC) message.

Clause 18: The method of any one of Clauses 13-17, wherein the first message comprises a groupcast message broadcast to multiple other apparatuses, including the second apparatus, in the environment or a unicast message transmitted only to the second apparatus.

Clause 19: The method of any one of Clauses 1-18, wherein the second delay value different from the first delay value by a threshold amount of time.

Clause 20: The method of any one of Clauses 1-19, wherein delay values, including at least the first delay value and the second delay value, are different between each frame of a set of frames of the plurality of frames, including at least the first frame and the second frame, according to a delay value pattern.

Clause 21: The method of Clause 20, wherein the delay value pattern is different from other delay value patterns for use by other apparatuses in the environment.

Clause 22: The method of any one of Clauses 20-21, further comprising selecting the delay value pattern from a plurality of delay patterns.

Clause 23: The method of Clause 22, further comprising receiving an indication, from a network entity, of the delay value pattern to select from the plurality of delay patterns.

Clause 24: The method of any one of Clauses 1-19, further comprising randomly selecting a different delay value to apply between frames of the plurality of frames, wherein the randomly selected different delay values are within a range between no delay and a maximum delay value.

Clause 25: The method of any one of Clauses 1-24, further comprising: maintaining a list of a plurality of radar targets; receiving one or more third signals in the first frame associated with one or more radar targets; receiving one or more fourth signals in the second frame associated with the one or more radar targets; determining, based on a first receive time associated with the one or more third signals and a second receive time associated with one or more fourth signals, that a distance traveled by the one or more radar targets during a period between the first receive time and the second receive time is greater than a threshold; and removing the one or more radar targets from the list of the plurality of radar targets.

Clause 26: A method for wireless communication, comprising: obtaining one or more measurements associated with an environment that includes a plurality of apparatuses; determining, based on the one or more measurements, a transmission configuration for transmitting one or more signals of a plurality of signals via a radar device in a plurality of frames, wherein the transmission configuration comprises a common transmission configuration for use in the environment; and transmitting signaling indicating the transmission configuration to one or more apparatuses of the plurality of apparatuses.

Clause 27: The method of Clause 26, wherein the transmission configuration comprises a set of parameters for generating and transmitting the plurality of signals.

Clause 28: The method of Clause 27, wherein the set of parameters comprise one or more of: a duration associated with the plurality of signals, a duration of a frequency ramp up and a frequency ramp down associated with the plurality of signals, a duration of an inactive period between transmission of signals of the plurality of signals, a number of signals of the plurality of signals to be transmitted during a frame of the plurality of frames, a carrier frequency associated with the radar device, or a frequency sweep or a bandwidth associated with the plurality of signals.

Clause 29: The method of any one of Clauses 26-28, wherein the transmission configuration depends on a geographical area of the environment and the transmission configuration is different for different geographical areas.

Clause 30: The method of any one of Clauses 26-29, wherein the signaling indicating the transmission configuration comprises an index associated with a transmission configuration codebook, the transmission configuration codebook including a plurality of different transmission configurations.

Clause 31: The method of Clause 30, wherein transmission configuration codebook is based on at least one of a geographical area of the environment.

Clause 32: The method of any one of Clauses 26-31, wherein the signaling indicating the transmission configuration comprises at least one of: a vehicle-to-everything (V2X) packet, a radar-dedicated signal comprising a preconfigured payload type and size, a sidelink control information (SCI) message, a media access control—control element (MAC-CE) message, or a radio resource control (RRC) message.

Clause 33: The method of any one of Clauses 26-32, wherein obtaining the one or more measurements comprises performing the one or more measurements, wherein the one or more measurements comprise at least one of: channel busy ratio (CBR) measurements, measurements indicating a number of unique identifiers (IDs) associated with the plurality of apparatuses operating in the environment, one or more measurements indicating an energy sensed on a radar-dedicated frequency band, or one or more measurements indicating a density of plurality of apparatuses in the environment based on one or more sensors.

Clause 34: The method of any one of Clauses 26-33, wherein obtaining the one or more measurements comprises receiving information indicating the one or more measurements from the one or more apparatuses of the plurality of apparatuses.

Clause 35: The method of any one of Clauses 26-34, further comprising receiving one or more messages from the one or more apparatuses in the environment, the one or more messages indicating one or more sets of transmission configurations supported by radar devices of the one or more apparatuses in the environment, wherein the transmission configuration comprises a transmission configuration most indicated in the one or more sets of transmission configurations.

Clause 36: The method of Clause 35, further comprising transmitting, to the one or more apparatuses, an indication of a delay value pattern to select from a plurality of delay patterns for use between frames of the plurality of frames.

Clause 37: The method of Clause 36, further comprises transmitting, to the one or more apparatuses, an indication of the plurality of delay patterns.

Clause 38: An apparatus, comprising: a memory comprising executable instructions; and one or more processors configured to execute the executable instructions and cause the apparatus to perform a method in accordance with any one of Clauses 1-37.

Clause 39: An apparatus, comprising means for performing a method in accordance with any one of Clauses 1-37.

Clause 40: A non-transitory computer-readable medium comprising executable instructions that, when executed by one or more processors of an apparatus, cause the apparatus to perform a method in accordance with any one of Clauses 1-37.

Clause 41: A computer program product embodied on a computer-readable storage medium comprising code for performing a method in accordance with any one of Clauses 1-37.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mm Wave or near mm Wave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}\times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

ADDITIONAL CONSIDERATIONS

The preceding description provides examples of coordinating waveform parameters and frame delays for multi-radar coexistence in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus, comprising:

one or more memories; and one or more processors configured to cause the apparatus to:

transmit, in an environment via a radar device of the apparatus based on a transmission configuration, one or more first signals of a plurality of signals in a first frame of a plurality of frames according to a first delay value occurring after a frame prior to the first frame, wherein the transmission configuration comprises a common transmission configuration for use in the environment; and transmit one or more second signals via the radar device in at least a second frame of the plurality of frames according to a second delay value occurring after the first frame based on the transmission configuration, wherein the second delay value is different from the first delay value.

2. The apparatus of claim 1, wherein the transmission configuration comprises a set of parameters for generating and transmitting the plurality of signals, including the one or more first signals and the one or more second signals.

3. The apparatus of claim 2, wherein the set of parameters comprise one or more of:

a duration associated with the plurality of signals, a duration of a frequency ramp up and a frequency ramp down associated with the plurality of signals, a duration of an inactive period between transmission of signals of the plurality of signals, a number of the one or more first signals to be transmitted during the first frame or a number of the one or more second signals to be transmitted during the second frame, a carrier frequency associated with the radar device, or a frequency sweep or a bandwidth associated with the plurality of signals.

4. The apparatus of claim 1, wherein the transmission configuration depends on a geographical area of the environment and the transmission configuration is different for different geographical areas.

5. The apparatus of claim 1, wherein the transmission configuration depends on a speed of the radar device.

6. The apparatus of claim 1, wherein the one or more processors are further configured to cause the apparatus to receive signaling indicating the transmission configuration from a network entity.

7. The apparatus of claim 6, wherein:
- the signaling indicating the transmission configuration comprises an index associated with a transmission configuration codebook,
- the transmission configuration codebook includes a plurality of different transmission configurations, and
- the one or more processors are further configured to cause the apparatus to select the transmission configuration from the transmission configuration codebook based on the index.

8. The apparatus of claim 6, wherein the signaling indicating the transmission configuration is received from the network entity in at least one of:
- a vehicle-to-everything (V2X) packet,
- a radar-dedicated signal comprising a preconfigured payload type and size, a sidelink control information (SCI) message,
- a media access control-control element (MAC-CE) message, or
- a radio resource control (RRC) message.

9. The apparatus of claim 6, the one or more processors are further configured to cause the apparatus to perform one or more measurements, wherein the one or more measurements comprise at least one of:
- channel busy ratio (CBR) measurements,
- measurements indicating a number of unique UE identifiers (IDs) associated with UEs operating in the environment,
- one or more measurements indicating an energy sensed on a radar-dedicated frequency band, or
- one or more measurements indicating a density of UEs in the environment based on one or more sensors other than the radar device.

10. The apparatus of claim 9, the one or more processors are further configured to cause the apparatus to transmit information indicating the one or more measurements to the network entity, wherein the signaling indicating the transmission configuration received from the network entity is based on the information indicating the one or more measurements.

11. The apparatus of claim 1, the one or more processors are further configured to cause the apparatus to select the transmission configuration from a transmission configuration codebook.

12. The apparatus of claim 11, wherein the one or more processors are configured to cause the apparatus to select the transmission configuration from the transmission configuration codebook based on at least one of a geographical area of the environment.

13. The apparatus of claim 1, wherein the one or more processors are further configured to cause the apparatus to:
- transmit a first message to a second apparatus in the environment, wherein the first message indicate a first set of transmission configurations supported by the radar device of the apparatus; and
- receive one or more second messages from one or more other apparatuses in the environment, wherein the one or more second messages indicate one or more second sets of transmission configurations supported by radar devices of the one or more other apparatuses in the environment.

14. The apparatus of claim 13, wherein the transmission configuration comprises a transmission configuration most indicated in the first set of transmission configurations and the one or more second sets of transmission configurations.

15. The apparatus of claim 14, the one or more processors are further configured to cause the apparatus to receive an indication from a network entity indicating the transmission configuration.

16. The apparatus of claim 13, wherein the one or more processors are configured to cause the apparatus to transmit the first message and receive the one or more second messages periodically or based on at least one criterion.

17. The apparatus of claim 13, wherein at least one of the first message or the one or more second messages comprises at least one of
- a vehicle-to-everything (V2X) packet,
- a sidelink control information (SCI) message,
- a media access control-control element (MAC-CE) message, or
- a radio resource control (RRC) message.

18. The apparatus of claim 13, wherein the first message comprises a groupcast message broadcast to multiple other apparatuses, including the second apparatus, in the environment or a unicast message transmitted only to the second apparatus.

19. The apparatus of claim 1, wherein delay values, including at least the first delay value and the second delay value, are different between each frame of a set of frames of the plurality of frames, including at least the first frame and the second frame, according to a delay value pattern.

20. The apparatus of claim 19, wherein the delay value pattern is different from other delay value patterns for use by other apparatuses in the environment.

21. The apparatus of claim 19, the one or more processors are further configured to cause the apparatus to select the delay value pattern from a plurality of delay patterns.

22. The apparatus of claim 21, the one or more processors are further configured to cause the apparatus to receive an indication, from a network entity, of the delay value pattern to select from the plurality of delay patterns.

23. The apparatus of claim 1, the one or more processors are further configured to cause the apparatus to randomly select a different delay value to apply between frames of the plurality of frames, wherein the randomly selected different delay values are within a range between no delay and a maximum delay value.

24. A method performed by an apparatus comprising a radar device, the method comprising:
- transmitting, in an environment via a radar device of the apparatus based on a transmission configuration, one or more first signals of a plurality of signals in a first frame of a plurality of frames according to a first delay value occurring after a frame prior to the first frame, wherein the transmission configuration comprises a common transmission configuration for use in the environment; and
- transmitting one or more second signals via the radar device in at least a second frame of the plurality of frames according to a second delay value occurring after the first frame based on the transmission configuration, wherein the second delay value is different from the first delay value.

* * * * *